(12) United States Patent
Funaki et al.

(10) Patent No.: US 7,986,324 B2
(45) Date of Patent: Jul. 26, 2011

(54) DISPLAY DEVICE, DISPLAY PROGRAM STORAGE MEDIUM AND DISPLAY METHOD

(75) Inventors: Isao Funaki, Kawasaki (JP); Hiroyuki Maekawa, Kawasaki (JP); Aki Kita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 11/987,278

(22) Filed: Nov. 28, 2007

(65) Prior Publication Data

US 2008/0170068 A1 Jul. 17, 2008

(30) Foreign Application Priority Data

Jan. 12, 2007 (JP) ................................. 2007-004492
Apr. 16, 2007 (JP) ................................. 2007-107223

(51) Int. Cl.
*G06T 11/00* (2006.01)
(52) U.S. Cl. ........................................................ 345/440
(58) Field of Classification Search .................... 345/440
See application file for complete search history.

(56) References Cited

U.S. PATENT DOCUMENTS

| | | | |
|---|---|---|---|
| 6,054,989 A * | 4/2000 | Robertson et al. | 715/848 |
| 6,545,687 B2 | 4/2003 | Scott et al. | |
| 6,754,906 B1 | 6/2004 | Finseth et al. | |
| 7,047,550 B1 * | 5/2006 | Yasukawa et al. | 725/44 |
| 2002/0000998 A1 | 1/2002 | Scott et al. | |
| 2002/0054158 A1 | 5/2002 | Asami | |
| 2003/0080977 A1 * | 5/2003 | Scott et al. | 345/629 |
| 2003/0123853 A1 * | 7/2003 | Iwahara et al. | 386/69 |
| 2003/0174132 A1 * | 9/2003 | Kunimatsu et al. | 345/419 |
| 2004/0039583 A1 * | 2/2004 | Saito et al. | 705/1 |
| 2004/0100484 A1 | 5/2004 | Barrett | |
| 2004/0150657 A1 | 8/2004 | Wittenburg et al. | |
| 2004/0189687 A1 * | 9/2004 | Yamamoto | 345/716 |
| 2005/0091596 A1 | 4/2005 | Anthony et al. | |
| 2005/0196016 A1 * | 9/2005 | Sato et al. | 382/103 |
| 2005/0235314 A1 * | 10/2005 | Choi | 725/39 |
| 2005/0275658 A1 * | 12/2005 | Sasaki et al. | 345/557 |

(Continued)

FOREIGN PATENT DOCUMENTS

CN 1206912 A 2/1999

(Continued)

OTHER PUBLICATIONS

Chinese Office Action issued on Jun. 12, 2009 in corresponding Chinese Patent Application 200710194214.7.

(Continued)

*Primary Examiner* — Javid A Amini
(74) *Attorney, Agent, or Firm* — Staas & Halsey LLP

(57) ABSTRACT

A display device which displays a list of data, including a date and time acquisition section which acquires the date and time associated with a piece of the data. The display device further includes: a three-dimensional display section which displays a three-dimensional space having axes respectively indicating the three kinds of time units, and arranges an icon indicating the piece of the data at a position corresponding to the date and time; and a two-dimensional display section which displays a two-dimensional space having axes indicating two kinds of time units including a first unit, which is the longest, among the three kinds of time units, and arranges a mark indicating that the data with which the date and time is associated exists at the position of the date and time acquired by the date and time acquisition section.

18 Claims, 17 Drawing Sheets

U.S. PATENT DOCUMENTS

| | | | |
|---|---|---|---|
| 2005/0289482 A1* | 12/2005 | Anthony et al. | 715/851 |
| 2007/0164989 A1 | 7/2007 | Rochford et al. | |
| 2007/0206916 A1* | 9/2007 | Funaki et al. | 386/52 |
| 2007/0277198 A1* | 11/2007 | Yasukawa et al. | 725/39 |

FOREIGN PATENT DOCUMENTS

| | | | |
|---|---|---|---|
| CN | 1674651 A | | 9/2005 |
| EP | 0859335 | | 8/1998 |
| EP | 0889647 | | 1/1999 |
| EP | 1 107 097 | | 6/2001 |
| EP | 1420362 | | 5/2004 |
| EP | 1429287 | | 6/2004 |
| EP | 1 793 309 | | 6/2007 |
| JP | 10-198337 | | 7/1998 |
| JP | 10-243309 | | 9/1998 |
| JP | 11-25541 | | 1/1999 |
| JP | 2001169197 A | * | 6/2001 |
| JP | 2001-344591 | | 12/2001 |
| JP | 2002-84469 | | 3/2002 |
| JP | 2004-172849 | | 6/2004 |
| JP | 2004-295231 | | 10/2004 |
| KR | 10-2006-0117870 | | 11/2006 |
| KR | 10-2008-0117870 | | 11/2006 |
| WO | 01/24518 | | 4/2001 |
| WO | 02/25626 | | 3/2002 |
| WO | 2007/015047 | | 2/2007 |
| WO | 2007/033354 | | 3/2007 |

OTHER PUBLICATIONS

Korean Office Action dated Jul. 27, 2009 and issued in corresponding Korean Patent Application 10-2007-0124821.

Extended European Search Report for corresponding European Patent Application No. 07121968.7, issued on Jan. 25, 2011.

Document regarding the consultation by telephone for corresponding European Patent Application No. 07121968.7, dated Feb. 24, 2011.

* cited by examiner

DISPLAY DEVICE, DISPLAY PROGRAM STORAGE MEDIUM AND DISPLAY METHOD

BACKGROUND OF THE INVENTION

1. Field of the Invention

The present invention relates to a display device which displays a list of data each of which a date and time is associated with, a display program storage medium, and a display method.

2. Description of the Related Art

Recently, an antenna for receiving TV radio waves and a TV tuner are included in a personal computer, and it is common to watch a TV program or record a delivered TV program with the use of a personal computer. Recently, it is also performed to deliver a program dedicated for a personal computer for free via an Internet line, and it is predicted that users who use a personal computer instead of a TV set or a video recorder will further increase.

Since a personal computer is provided with a high-capacity hard disk device, it is possible to record a lot of programs without the necessity of worrying about the remaining capacity, and it is possible to keep the recorded programs without requiring much space unlike a video recorder using a video tape. Furthermore, since it is easy to copy a recorded program to a DVD or the like and delete an unnecessary recorded program, a lot of users record all interesting programs for the present. Consequently, there may be a case where a large number of programs have been accumulated in the hard disk device of the personal computer, and there is a problem that it is very difficult to find a desired program from among the recorded programs in such a situation.

In Japanese Patent Laid-Open No. 11-25541, Japanese Patent Laid-Open No. 2002-84469, and Japanese Patent Laid-Open No. 10-243309, description is made on a technique for displaying a program table in which the titles of programs scheduled to be delivered are arranged on a three-dimensional space having axes indicating the time, the day, the week or the like, as a technique for displaying a list of programs. Though the techniques are for displaying a list of programs scheduled to be delivered, it is possible to, by using the technique for displaying a list of recorded programs, quickly recognize when the programs were delivered. Furthermore, for example, by arranging the program titles on a three-dimensional space having axes indicating the time, the day of the week, and the week, the program titles of the installments of a serial drama delivered at the same time on the same day of every week are arranged on the same straight line. Therefore, it is possible to easily select a program when watching the programs sequentially.

However, if causing the time and the day of the week to correspond to the vertical axis and the horizontal axis in accordance with a conventional program table, the installments of a serial drama delivered at the same time on the same day of the week are arranged on the same straight line in the depth direction, and therefore, it is difficult for a user to check at a glance whether he or she has not failed to record any of a series of programs which he or she wants to record every week without fail.

Such a problem not only occurs in the case of displaying a list of recorded programs but also commonly occurs in the case of displaying a list of data each of which a date and time is associated with, for example, in the case of displaying a list of taken images recorded in a recording medium.

SUMMARY OF THE INVENTION

The present invention has been made in view of the above circumstances and provides a display device capable of, even when a large amount of data is stored, displaying a list of the data in a manner that the data can be easily seen, a display program storage medium and a display method therefore.

The present invention provides a display device which displays a list of data each of which a date and time is associated with, the display device including:

a date and time acquisition section which acquires the date and time associated with a piece of the data;

a three-dimensional display section which displays, when a date and time is expressed by a combination of three kinds of time units with different lengths, a three-dimensional space having axes respectively indicating the three kinds of time units, and arranges an icon indicating the piece of the data at a position corresponding to the date and time acquired by the date and time acquisition section, on the three-dimensional space; and a two-dimensional display section which displays a two-dimensional space having axes respectively indicating two kinds of time units including a first unit, which is the longest, among the three kinds of time units, and arranges a mark indicating that the data with which the date and time is associated exists at the position of the date and time acquired by the date and time acquisition section, on the two-dimensional space.

According to the display device of the present invention, the icon of data is arranged at the position of the date and time associated with the data, on a three-dimensional space having axes indicating three kinds of time units with different lengths, and a mark is arranged at the position of the date and time associated with the data, on a two-dimensional space having the axis indicating a first unit that is the longest among the three kinds of time units. It is possible to recognize which data is associated with which date and time, by the positions at which the icons are arranged, on the three-dimensional space, and it is possible to easily recognize existence of data among data arranged in the depth direction on the three-dimensional space, by checking whether or not the mark of the data is arranged on the two-dimensional space.

It is preferable that, in the display device of the present invention, the data is picture data indicating a picture.

It often occurs that a large amount of picture data, such as recorded data in which a program is recorded or taken image data in which a subject is photographed, is stored in a storage device. Therefore, a great advantage can be obtained by the display device of the present invention.

It is preferable that the display device of the present invention includes:

a specification section which displays a specification frame along the other axis than the axis indicating the first unit, and specifies a time area having the same length as the length of the first unit by moving the specification frame along the axis indicating the first unit in response to an operation; and a display control section which causes the three-dimensional display section to arrange the icon, with the time area specified by the specification section positioned at the front.

By moving the specification frame on the two-dimensional space, the display on the three-dimensional space can be easily changed.

It is preferable that the display device of the present invention has multiple reference periods separated at predetermined dates and times;

when displaying the two-dimensional space, the two-dimensional display section displays only an area indicating one reference period on the two-dimensional space;

when displaying the three-dimensional space, the three-dimensional display section displays only an area corresponding to the area displayed by the two-dimensional display section on the three-dimensional space; and when the specification frame is moved to a date and time beyond a reference period already displayed, on the two-dimensional space, by the specification section, the display control section causes the two-dimensional display section to change the display to an area indicating a reference period to which the date and time moved by the specification section belongs, and also causes the three-dimensional display section to change the display to an area corresponding to the area displayed by the two-dimensional display section.

Conventionally, a series of programs, such as a serial drama delivered at the same time every week, is often exchanged with a different one every several months. By changing the display of the two-dimensional space and the three-dimensional space for each reference period, it is possible to collectively check the recording state of the programs of the same series.

The display device of the present invention preferably further "includes a period specification section which specifies the length of the reference period, and the two-dimensional display section displays only an area indicating one reference period separated with a length specified by the period specification section, on the two-dimensional space."

By providing the period specification section, it is possible to specify a reference period to be displayed on the two-dimensional space according to purposes.

It is preferable that the display device of the present invention further includes a number-of-data display section which displays the number of data with each of which a date and time within the time area specified by the specification section is associated.

According to this preferable display device, it is possible to easily check the number of data associated with dates and times within a time area specified by the specification section.

It is preferable that the display device of the present invention further includes a mark selection section which, in response to specification of a mark arranged on the two-dimensional space, selects data associated with a date and time indicated by the position where the mark is arranged.

By providing the mark selection section, it is possible to easily select data from among data arranged in the depth direction on the three-dimensional space.

It is preferable that, in the display device of the present invention, when displaying the three-dimensional space, the three-dimensional display section displays the three-dimensional space excluding areas in which no icon is arranged.

By excluding the areas in which no icon is arranged, it is possible to expand only necessary areas so that they can be easily seen.

It is preferable that the display device of the present invention further includes:

an icon selection section which, in response to specification of one of icons arranged on the three-dimensional space, collectively selects the specified icon and icons aligned with the specified icon in the direction of the axis indicating the first unit; and an icon highlighting section which highlights the icons selected by the icon selection section.

According to this preferable display device, it is possible to easily check the icons selected on the three-dimensional space.

It is preferable that the display device of the present invention further includes:

an icon selection section which, in response to specification of one of icons arranged on the three-dimensional space, collectively selects the specified icon and icons aligned with the specified icon in the direction of the axis indicating a week; and a mark highlighting section which highlights marks corresponding to the icons selected by the icon selection section among marks arranged on the two-dimensional space.

According to this preferable display device, it is possible to easily check the position on the two-dimensional space, of the program indicated by the icon selected on the three-dimensional space.

It is preferable that, in the display device of the present invention, the data is program data which indicates a program and with which the delivery date and time of the program is associated; and the date and time acquisition section acquires the delivery date and time.

It often occurs that a large amount of program data indicating programs is stored in a hard disk device and the like. Therefore, a great advantage can be obtained by the display device of the present invention.

It is preferable that, in the display device of the present invention, the three-dimensional display section displays a three-dimensional space having axes indicating time, day of week, and week, respectively, and arranges an icon indicating the program at a position corresponding to the delivery date and time acquired by the date and time acquisition section on the three-dimensional space; and the two-dimensional display section displays a two-dimensional space having axes indicating the day of week, and the week, respectively, and arranges, at a position corresponding to the day of the delivery date and time acquired by the date and time acquisition section, a mark indicating that a program delivered on the day exists.

It is possible to recognize when a recorded program was delivered by the position where the icon is arranged on the three-dimensional space, and it is possible to easily recognize whether recording of any installment of a series of programs delivered every week was forgotten by checking whether or not a mark is arranged on the two-dimensional space.

It is preferable that, in the display device of the present invention, the data is taken image data which indicates a taken image obtained by photographing a subject and with which the photographing date and time of the taken image is associated; and the date and time acquisition section acquires the photographing date and time.

Since it also often occurs that a large number of taken images are stored in a recording medium, a great advantage can be obtained by the display device of the present invention.

It is preferable that, in the display device of the present invention, the three-dimensional display section displays a three-dimensional space having axes indicating three kinds of time units including the day and the time, respectively, and arranges an icon indicating the taken image at a position corresponding to the photographing date and time acquired by the date and time acquisition section on the three-dimensional space; and the two-dimensional display section displays a two-dimensional space having axes indicating the day and the time, respectively, and arranges, at a position corresponding to the photographing date and time acquired by the date and time acquisition section, a mark indicating that an image taken at the photographing date and time exists.

According to this preferable display device, it is possible to check a list of images taken on the same day by the positions at which the icons are arranged, on the three-dimensional space, and it is possible to easily recognize the day when image taking was performed, by the position where a mark is arranged on the two-dimensional space.

The present invention also provides a display program storage medium storing a display program which is executed in a computer to construct a display device for displaying a list of data each of which a date and time is associated with, on the computer, the program constructing:

a date and time acquisition section which acquires the date and time associated with a piece of the data;

a three-dimensional display section which displays, when a date and time is expressed by a combination of three kinds of time units with different lengths, a three-dimensional space having axes respectively indicating the three kinds of time units, and arranges an icon indicating the piece of the data at a position corresponding to the date and time acquired by the date and time acquisition section, on the three-dimensional space; and a two-dimensional display section which displays a two-dimensional space having axes respectively indicating two kinds of time units including a first unit, which is the longest, among the three kinds of time units, and arranges a mark indicating that the data with which the date and time is associated exists at the position of the date and time acquired by the date and time acquisition section, on the two-dimensional space.

As for the elements constructed on a computer system by the display program of the present invention, such as the date and time acquisition section, one element may be constructed by one program part, or multiple elements may be constructed by one program part. Furthermore, these elements may be so constructed as to execute the operation themselves, or they may be so constructed as to instruct other programs or program parts included in the computer system to execute the operation.

It is preferable that, in the display program storage medium of the present invention, the data is picture data indicating a picture.

It often occurs that a large amount of picture data, such as recorded data in which a program is recorded or taken image data in which a subject is photographed, is often stored in a storage device and the like. Therefore, a great advantage can be obtained by the display device of the present invention.

As for the display program storage medium, only the basic feature thereof is described here simply in order to avoid repetition. As the display program storage medium according to the present invention, not only the above basic feature but also various features corresponding to the respective features of the display device are included.

The present invention also provides a display method for displaying a list of data each of which a date and time is associated with, the display method including:

a date and time acquisition step which acquires the date and time associated with a piece of the data;

a three-dimensional display step which displays, when a date and time is expressed by a combination of three kinds of time units with different lengths, a three-dimensional space having axes respectively indicating the three kinds of time units, and arranges an icon indicating the piece of the data at a position corresponding to the date and time acquired by the date and time acquisition step, on the three-dimensional space; and a two-dimensional display step which displays a two-dimensional space having axes respectively indicating two kinds of time units including a first unit, which is the longest, among the three kinds of time units, and arranges a mark indicating that the data with which the date and time is associated exists at the position of the date and time acquired by the date and time acquisition step, on the two-dimensional space.

It is preferable that, in the display method of the present invention, the data is picture data indicating a picture.

According to the display method of the present invention, it is possible to, even when a large amount of data is stored, display a list of the data in a manner that the data can be easily seen.

As for the display method also, only the basic feature thereof is described here simply in order to avoid repetition. As the display method according to the present invention, not only the above basic feature but also various features corresponding to the respective features of the display device are included.

According to the present invention, it is possible to, even when a large amount of data is stored, display a list of the data in a manner that the data can be easily seen.

DETAILED DESCRIPTION OF THE INVENTION

Embodiments of the present invention will be described below with reference to drawings.

Figure 1:
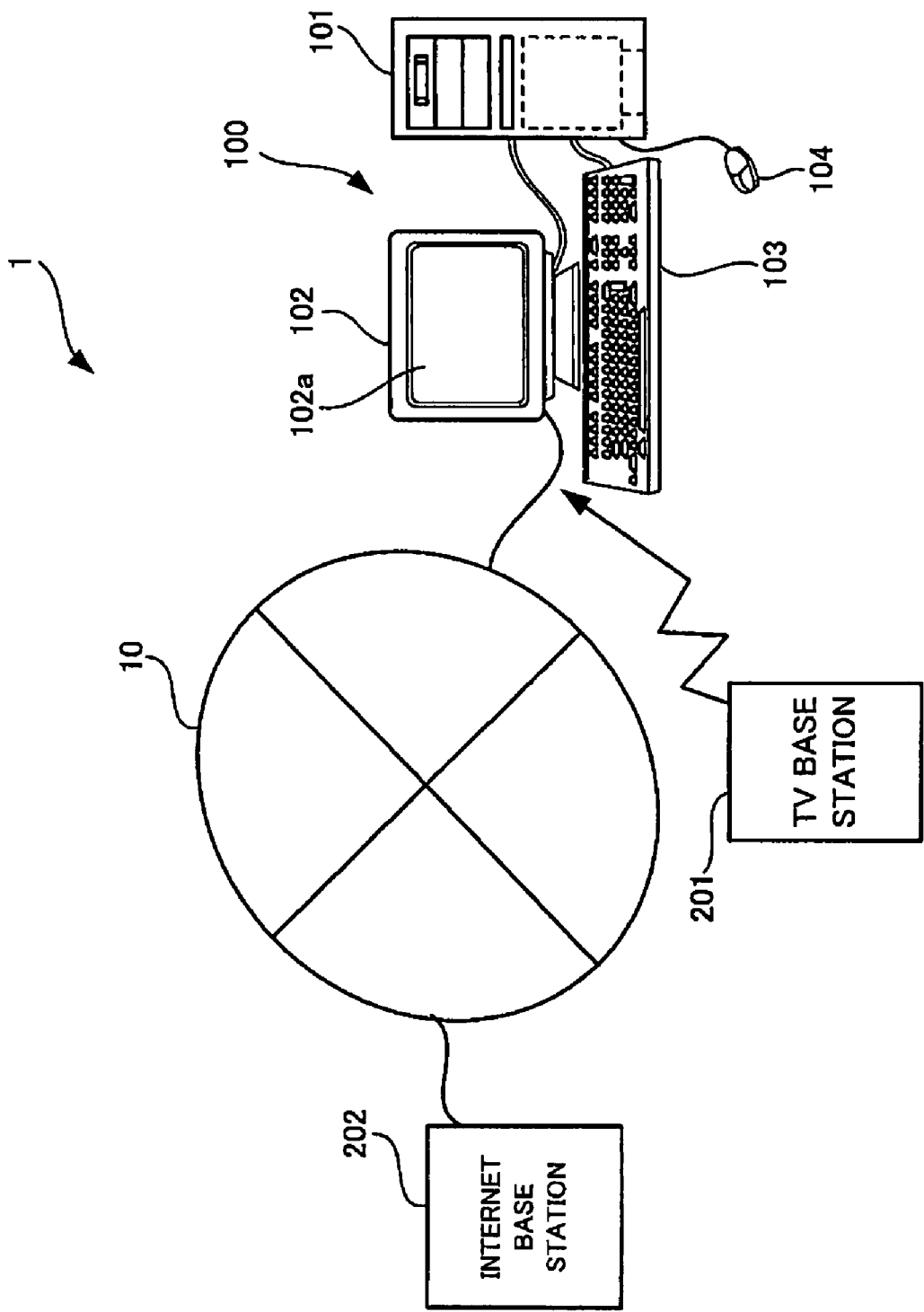
FIG. 1 is a schematic configuration diagram of a program delivery system to which an embodiment of the present invention is applied.

FIG. 1 is a schematic configuration diagram of a program delivery system to which an embodiment of the present invention is applied.

This program delivery system 1 is configured by a TV base station 201 and an Internet base station 202 which deliver programs, and a personal computer 100 which receives programs delivered from the TV base station 201 and the Internet base station 202. Though the program delivery system 1 is actually configured by a lot of base stations, a lot of personal computers and the like connected thereto, FIG. 1 shows only the elements required for description of the present invention.

The TV base station 201 delivers TV programs using the radio waves of a channel assigned to the base station.

The Internet base station 202 delivers programs dedicated for the Internet using an Internet line 10.

The personal computer 100 includes an antennal for receiving a program delivered from the TV base station 201, a TV tuner (see FIG. 2), and an input/output interface for receiving a program delivered from the Internet base station 202. The personal computer 100 receives a program delivered from the TV base station 201 or the Internet base station 202, and displays or records the received program in accordance with a user operation. The personal computer 100 is an embodiment of the display device of the present invention, and detailed description will be made below on this personal computer 100.

The personal computer 100 is externally configured to include a main device 101, an image display device 102 which displays an image on a display screen 102a in response to an instruction from the main device 101, a keyboard 103 which inputs various kinds of information corresponding to key operations, to the main device 101, and a mouse 104 which, by specifying an arbitrary position on the display screen 102a, inputs an instruction corresponding to, for example, an icon displayed at the position. The main device 101 has a CD/DVD insertion port for inserting a DVD or a CD-ROM and an FD insertion port for inserting a flexible disk (hereinafter, abbreviated as an FD).

Figure 2:
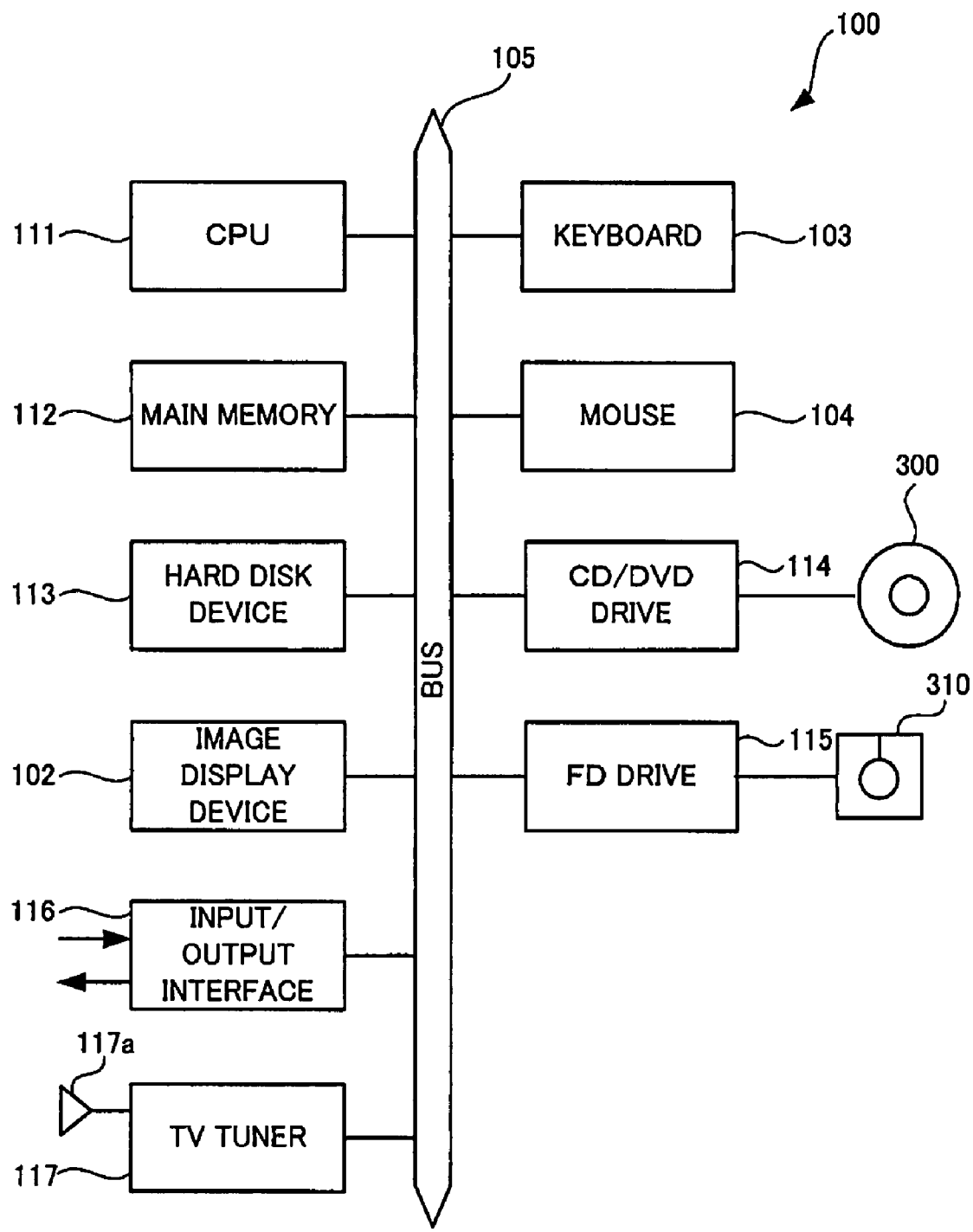
FIG. 2 is an internal configuration diagram of a personal computer.

FIG. 2 is an internal configuration diagram of the personal computer 100.

Inside the main device 101, there are included a CPU 111 which executes various programs, a main memory 112 where a program stored in a hard disk device 113 is read and developed to be executed by the CPU 111, the hard disk device 113 in which various programs, data and the like are stored, a CD/DVD drive 114 in which a CD-ROM 300 or a DVD is mounted and which accesses the mounted CD-ROM 300 or DVD, an FD drive 115 in which an FD 310 is mounted and which accesses the mounted FD 310, an input/output interface 116 which receives a program or program information from the Internet base station 202 shown in FIG. 1 and which is connected to an external apparatus, such as a digital camera, to send and receive data to and from the external apparatus, an antenna 117a which receives TV radio waves transmitted from the TV base station 201 shown in FIG. 1 and the like, and a TV tuner 117 which generates a picture signal on the basis of the radio waves received by the antenna 117a, as shown in FIG. 2. These various elements and the image display device 102, the keyboard 103 and the mouse 104 also shown in FIG. 2 are connected mutually via a bus 105.

In the CD-ROM 300, a recording/reproduction program is stored. The CD-ROM 300 is mounted in the CD/DVD drive 114, and the recording/reproduction program stored in the CD-ROM 300 is uploaded to this the personal computer 100 and stored in the hard disk device 113. Then, by this display program being activated and executed, a recording/reproduction device 500 (see FIG. 4) to which an embodiment of the display device of the present invention is applied is constructed in the personal computer 100.

Next, the recording/reproduction program executed in this personal computer 100 will be described.

Figure 3:
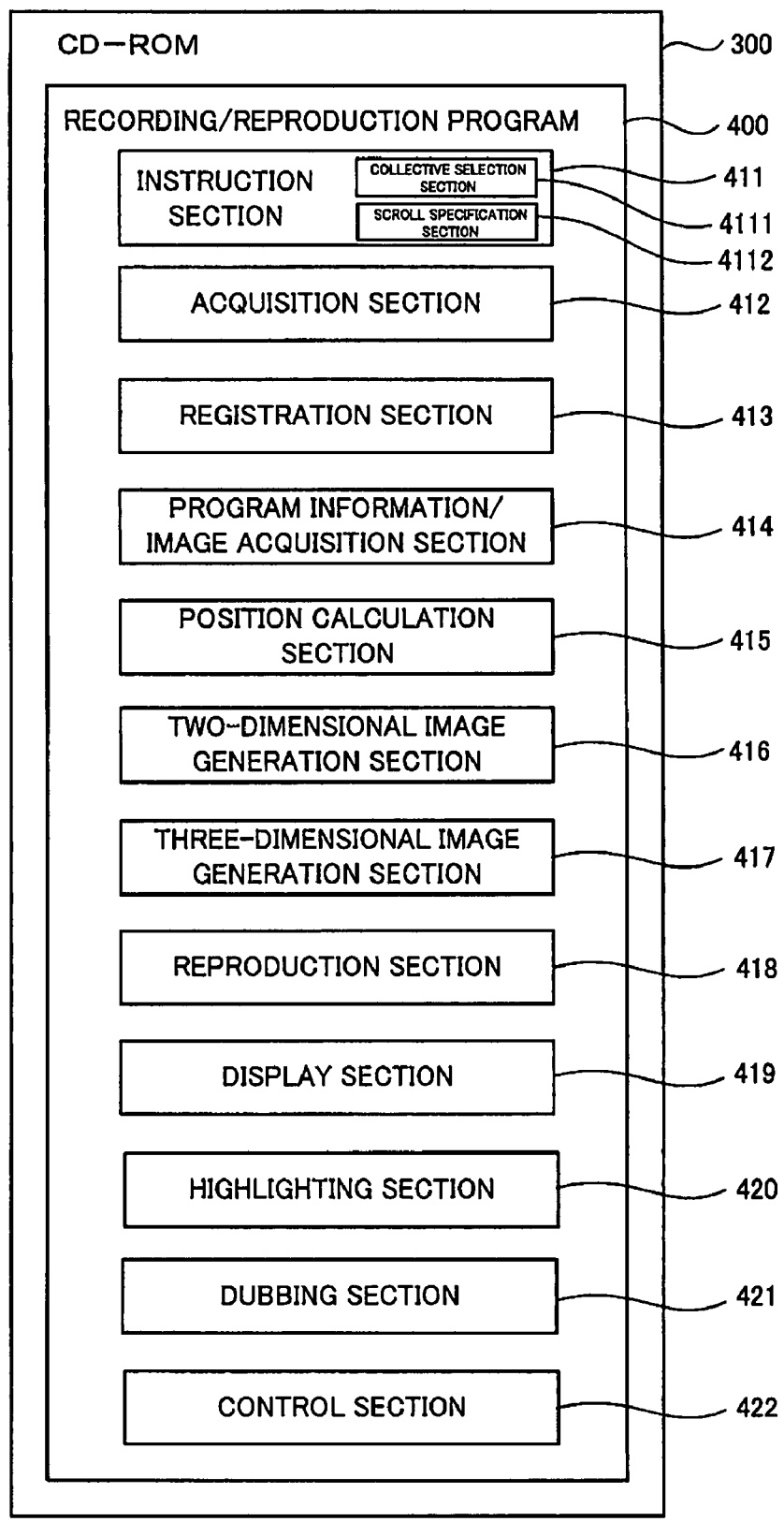
FIG. 3 is a conceptual diagram showing a CD-ROM in which a recording/reproduction program is stored.

FIG. 3 is a conceptual diagram showing the CD-ROM 300 in which the recording/reproduction program is stored.

A recording/reproduction program 400 is configured by an instruction section 411, an acquisition section 412, a registration section 413, a program information/image acquisition section 414, a position calculation section 415, a two-dimensional image generation section 416, a three-dimensional image generation section 417, a reproduction section 418, a display section 419, a highlighting section 420, a dubbing section 421 and a control section 422. The instruction section 411 has a collective selection section 4111 and a scroll specification section 4112. The details of each section of the recording/reproduction program 400 will be described together with the operation of each section of the recording/reproduction device 500.

Though the CD-ROM 300 is shown as an example of the recording medium for storing the recording/reproduction program in FIG. 3, the recording medium for storing the display program of the present invention is not limited to a CD-ROM. Other storage media, such as an optical disk, an MO, an FD and a magnetic tape, are also possible. Furthermore, the display program of the present invention may be directly provided for the computer not via a recording medium but via a communication network.

Figure 4:
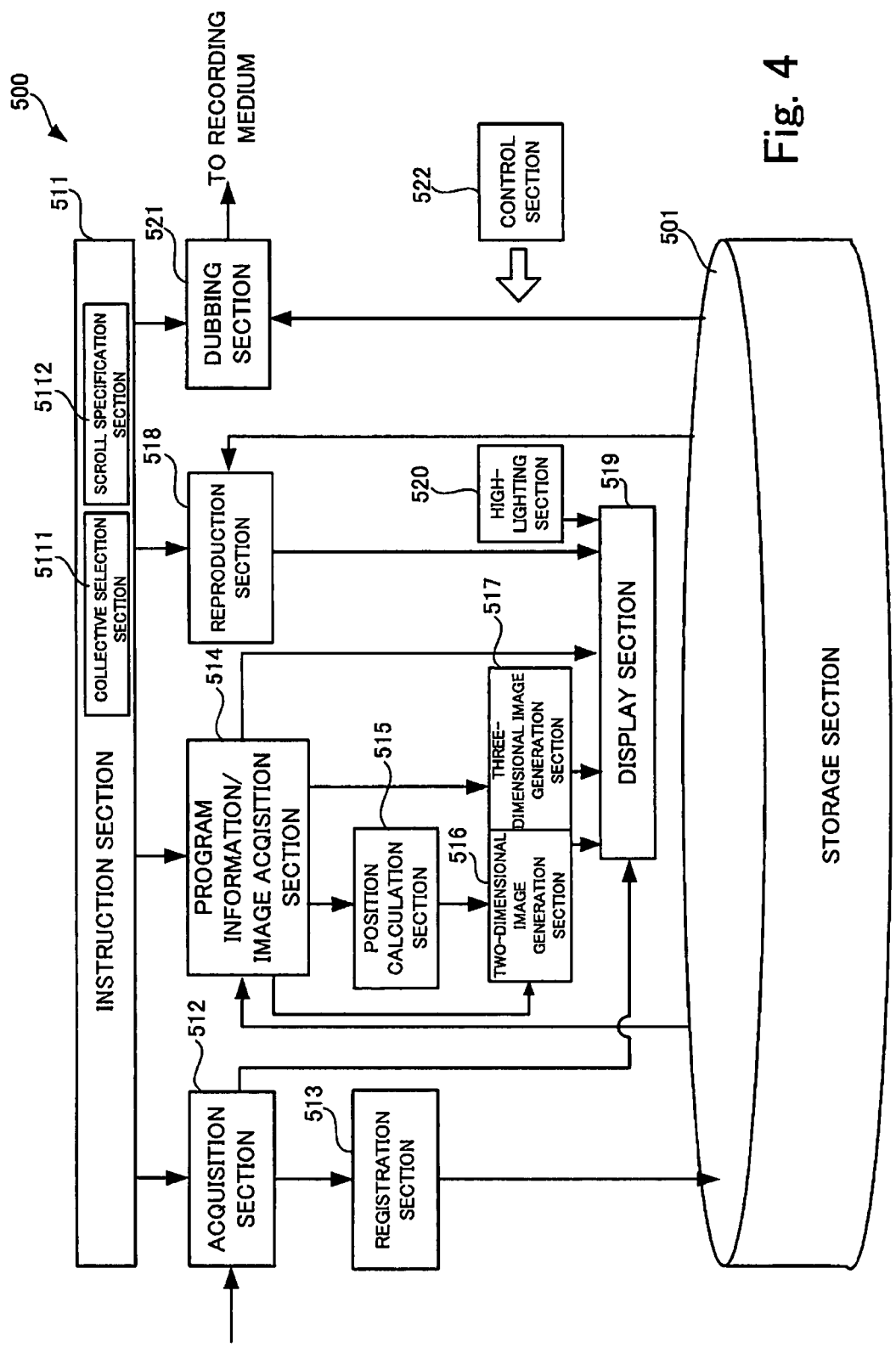
FIG. 4 is a functional block diagram of a recording/reproduction apparatus.

FIG. 4 is a functional block diagram of the recording/reproduction device 500 to be constructed in the personal computer 100 when the recording/reproduction program 400 is installed in the personal computer 100 shown in FIG. 1.

The recording/reproduction apparatus 500 shown in FIG. 4 is provided with an instruction section 511, an acquisition section 512, a registration section 513, a program information/image acquisition section 514, a position calculation section 515, a two-dimensional image generation section 516, a three-dimensional image generation section 517, a reproduction section 518, a display section 519, a highlighting section 520, a dubbing section 521, a control section 522 and a storage section 501. Furthermore, the instruction section 511 is provided with a collective selection section 5111 and a scroll specification section 5112. When the recording/reproduction program 400 shown in FIG. 3 is installed in the personal computer 100 shown in FIG. 1, the instruction section 411 of the recording/reproduction program 400 constructs the instruction section 511 in FIG. 4. Similarly, the collective selection section 4111 constructs the collective selection section 5111, the scroll specification section 4112 constructs the scroll specification section 5112, the acquisition section 412 constructs the acquisition section 512, the registration section 413 constructs the registration section 513, the program information/image acquisition section 414 constructs the program information/image acquisition section 514, the position calculation section 415 constructs the position calculation section 515, the two-dimensional image generation section 416 constructs the two-dimensional image generation section 516, the three-dimensional image generation section 417 constructs the three-dimensional image generation section 517, the reproduction section 418 constructs the reproduction section 518, the display section 419 constructs the display section 519, the highlighting section 420 constructs the highlighting section 520, the dubbing section 421 constructs the dubbing section 521, and the control section 422 constructs the control section 522.

Each element in FIG. 4 is configured by combination of hardware of the computer, an OS, and an application program to be executed by the computer. In comparison, each element of the recording/reproduction program 400 shown in FIG. 3 differs in that it is configured only by an application program.

By describing each element of the recording/reproduction device 500 shown in FIG. 4, each element of the recording/reproduction program 400 shown in FIG. 3 will be also described simultaneously.

The keyboard 103 or mouse 104 shown in FIG. 1 plays the role of the instruction section 511. It communicates instructions which are inputted by the user in accordance with various setting screens displayed on the display screen 102a, to the various elements corresponding to the instructions. The instruction section 511 is provided with the collective selection section 5111 and the scroll specification section 5112.

When one program is specified by the user on a three-dimensional image, the collective selection section 5111 collectively selects programs delivered at the same time in the same week as the program. The collective selection section 5111 corresponds to an example of the icon selection section according to the present invention.

The scroll specification section 5112 displays a scroll bar for changing display of the three-dimensional image, on a two-dimensional image. The scroll specification section 5112 corresponds to an example of the specification section according to the present invention.

The control section 522 controls each element of the recording/reproduction device 500 shown in FIG. 4 in accordance with an instruction inputted by the instruction section 511. The control section 522 corresponds to an example of the display control section according to the present invention.

The TV radio waves transmitted from the TV base station 201 shown in FIG. 1 are received by the antenna 117a shown in FIG. 2. When display or recording of a TV program is instructed by the user, the radio wave of the specified channel is converted to a program signal by the TV tuner 117. When display of the TV program is instructed by the user, the acquisition section 512 acquires the program signal from the TV tuner 117 and transfers it to the display section 519. When recording of the TV program is instructed by the user, the acquisition section 512 digitalizes the program signal to generate program data, and sends the program data to the registration section 513. When display or recording of an Internet program is instructed by the user, digital program data transmitted from the Internet base station 202 shown in FIG. 1 is received by the input/output interface 116 in FIG. 2 and acquired by the acquisition section 512. When display of the Internet program is instructed by the user, the acquisition section 512 transfers the program data to the display section 519. When recording of the Internet program is instructed by the user, the acquisition section 512 transfers the program data to the registration section 513.

The registration section 513 cuts a scene in the program indicated by the program data sent from the acquisition section 512 and reduces its size to generate a thumbnail image. Furthermore, the registration section 513 stores the program data in the storage section 501 together with the program information and the thumbnail image (that is, it records the program indicated by the program data).

The hard disk device 113 shown in FIG. 2 plays the role of the storage section 501, and program data indicating recorded programs are stored there in association with program information delivered from the base stations 201 and 202 and thumbnail images obtained by cutting scenes from the programs. The hard disk device in which the program data is actually stored may exist at an end connected to the network.

The program information/image acquisition section 514 acquires the program information and the thumbnail image of the program which are stored in the storage section 501. The program information/image acquisition section 514 corresponds to an example of the date and time acquisition section according to the present invention.

The position calculation section 515 calculates a position corresponding a delivery date and time included in the program information acquired by the program information/image acquisition section 514, on a three-dimensional space having axes indicating the day of the week, the time, and the week (hereinafter, this position is referred to as a three-dimensional position) and calculates a position corresponding to the three-dimensional position, on a two-dimensional space having axes indicating the day of the week, and the week (hereinafter, this position is referred to as a two-dimensional position).

The three-dimensional image generation section 517 generates a three-dimensional image, with the thumbnail image acquired by the program information/image acquisition section 514 arranged at the three-dimensional position calculated by the position calculation section 515 on the three-dimensional space.

The two-dimensional image generation section 516 generates a two-dimensional image with a mark, which indicates that a recorded program exists, arranged on the two-dimensional position calculated by the position calculation section 515 on the two-dimensional space.

The reproduction section 518 acquires program data indicating a program the reproduction of which has been instructed by the user from the storage section 501, and sends the acquired program data to the display section 519.

The image display device 102 shown in FIG. 2 plays the role of the display section 519 that is provided with both of a digital display function for displaying an image on the basis of program data for digital broadcast and an analog display function for displaying an image on the basis of a program signal for analog broadcast. The display section 519 displays a program for analog broadcast or a digital program sent from the acquisition section 512, a three-dimensional image generated by the three-dimensional image generation section 517, a two-dimensional image generated by the two-dimensional image generation section 516, a reproduction picture sent from the reproduction section 518 or the like on the display screen 102a shown in FIG. 1. The combination of the position calculation section 515, the three-dimensional image generation section 517 and the display section 519 corresponds to an example of the three-dimensional display section according to the present invention, and the combination of the position calculation section 515, the two-dimensional image generation section 516 and the display section 519 corresponds to an example of the two-dimensional display section according to the present invention.

The highlighting section 520 highlights a thumbnail image selected on a three-dimensional image and highlights the mark on a two-dimensional image which corresponds to the thumbnail image. The highlighting section 520 corresponds not only to an example of the icon highlighting selection section according to the present invention but also to an example of the mark highlighting section according to the present invention.

The CD/DVD drive 114 shown in FIG. 2 plays the role of the dubbing section 521 that acquires program data indicating a program the dubbing of which has been instructed by the user, from the storage section 501 and records the acquired program data in a DVD (that is, it dubs the program in a DVD).

The recording/reproduction device 500 is basically configured as described above.

Now, description will be made on a series of processes performed when the user selects a desired program from among programs recorded and stored in the storage section 501.

Figure 5:
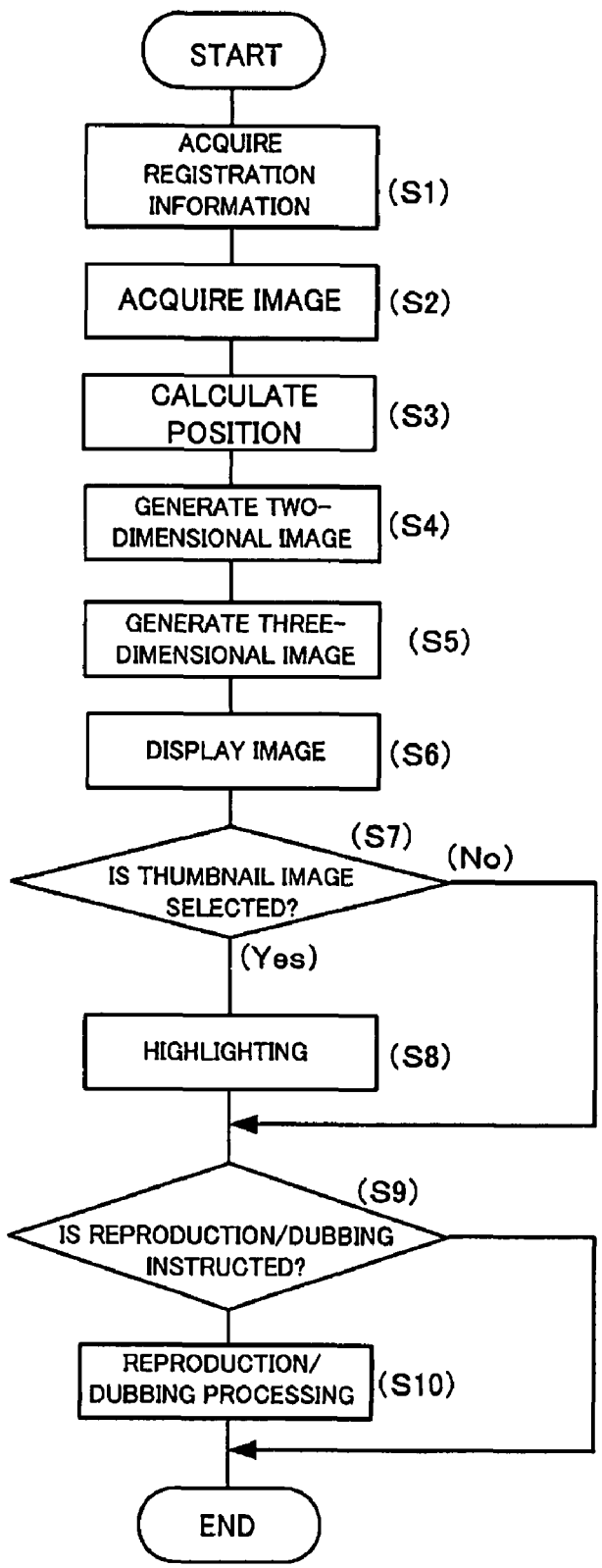
FIG. 5 is a flowchart showing the flow of a series of processes for selecting a desired program from among programs which have been recorded and stored, and reproducing/dubbing the program.

FIG. 5 is a flowchart showing the flow of a series of processes for selecting a desired program from among programs which have been recorded and stored, and reproducing/dubbing the program.

When a recorded program is selected, the user first instructs display of the recorded programs stored in the storage section 501 as a list. An instruction screen for displaying a list of recorded programs is prepared in advance in the recording/reproduction device 500. When the user inputs an instruction to display the list with the use of the mouse 104 or the like, the instruction is communicated from the instruction section 511 in FIG. 4 to the program information/image acquisition section 514 in FIG. 4.

The program information/image acquisition section 514 acquires program information and a thumbnail image which are stored in the storage section 501 (steps S1 and S2 in FIG. 5).

The processing at step S1 for acquiring the program information corresponds to an example of a delivery date and time acquisition step in the display method of the present invention. The acquired program information is communicated to the position calculation section 515, and the acquired thumbnail image is communicated to the three-dimensional image generation section 517.

The position calculation section 515 calculates a three-dimensional position corresponding to the delivery date and time included in the program information communicated from the program information/image acquisition section 514, on a three-dimensional space having axes indicating the time, the day of the week, and the week, and a two-dimensional position corresponding to the three-dimensional position, on a two-dimensional space having two axes indicating the day of the week, and the week (step S3 in FIG. 5).

Figure 6:
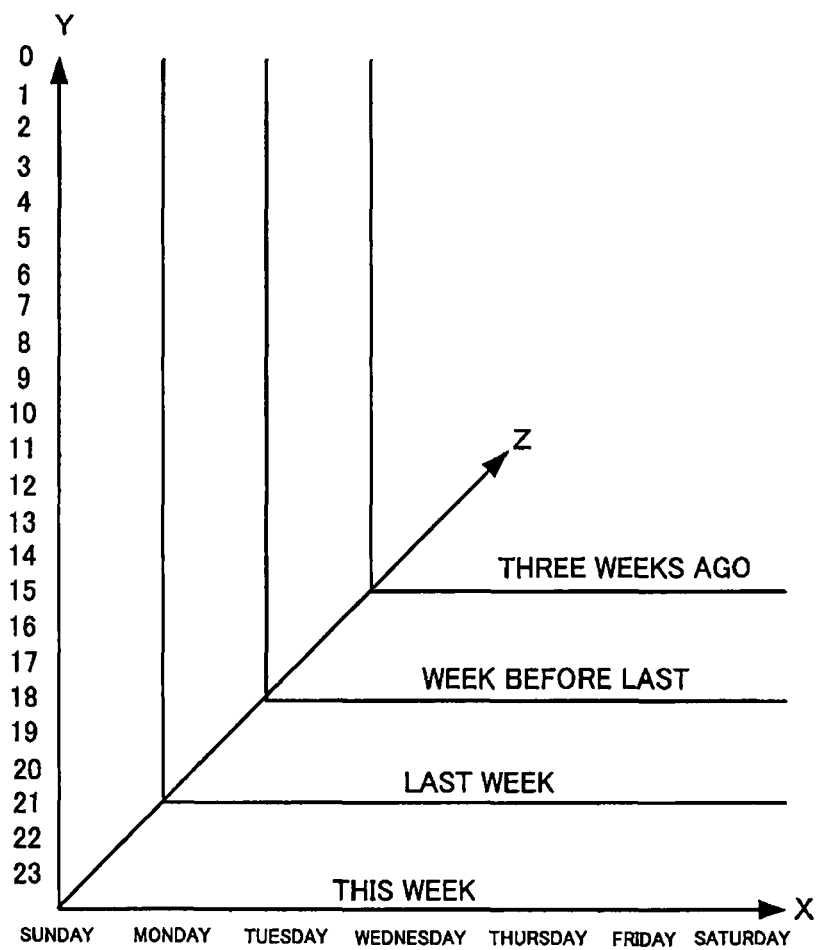
FIG. 6 is a conceptual diagram showing an example of a three-dimensional space.
Figure 7:
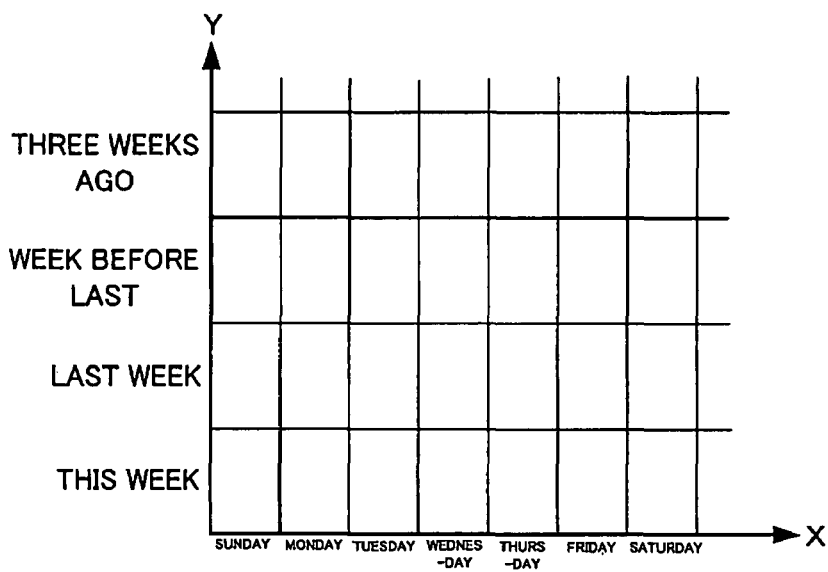
FIG. 7 is a conceptual diagram showing an example of a two-dimensional space.

FIG. 6 is a conceptual diagram showing an example of the three-dimensional space, and FIG. 7 is a conceptual diagram showing an example of the two-dimensional space.

As shown in FIG. 6, a three-dimensional space having an X-axis (horizontal direction) indicating the day of the week, a Y-axis (vertical direction) indicating the time, and a Z-axis (depth direction) indicating the week is applied in this embodiment.

On the X-axis of the three-dimensional space, Monday, Tuesday, . . . and Saturday are sequentially assigned, with Sunday as the starting point. The day of the week, which is the value on the X-axis, is calculated on the basis of the date "DD, MM, YYYY" of the delivery date and time (HH o'clock PP minutes, DD, MM, YYYY). Since the method for calculating the day of the week from a date has been well known, description thereof is omitted in this specification.

On the Y-axis of the three-dimensional space, 22 o'clock, 21 o'clock, . . . , 1 o'clock and 0 o'clock are sequentially assigned, with 23 o'clock as the starting point. The "time HH" of the delivery date and time (HH o'clock PP minutes, DD, MM, YYYY") is acquired as a value on the Y-axis.

On the Z-axis of the three-dimensional space, last week, the week before last, . . . are sequentially assigned, with this week as the starting point. The week, which is a value on the Z-axis, is calculated on the basis of the date "DD, MM, YYYY" of the delivery date and time (HH o'clock PP minutes, DD, MM, YYYY) and the date of today.

As shown in FIG. 7, a two-dimensional space having an X-axis (horizontal direction) indicating the day of the week and a Y-axis (vertical direction) indicating the week is applied in this embodiment.

On the X-axis of the two-dimensional space, Monday, Tuesday, . . . , and Saturday are sequentially assigned, with Sunday as the starting point, similarly to the X-axis of the three-dimensional space shown in FIG. 6. The value on the X-axis of the three-dimensional space is immediately calculated as a value on the X-axis of the two-dimensional space.

On the Y-axis of the two-dimensional space, last week, the week before last, . . . are sequentially assigned, with this week as the starting point. The value on the Z-axis of the three-dimensional space is immediately calculated as a value on the Y-axis of the two-dimensional space.

For example, when multiple programs are recorded at different times on the same day, multiple positions each of which corresponds to the "time HH" in the delivery date and time of each program are calculated as positions on the three-dimensional space, while the same position is calculated as the positions of the multiple programs on the two-dimensional space. That is, a mark on the two-dimensional space indicates that one or more programs recorded on the day exist.

The calculated position on the two-dimensional space (two-dimensional position) is communicated to the two-dimensional image generation section 516, and the positions on the three-dimensional space are communicated to the three-dimensional image generation section 517.

The two-dimensional image generation section 516 generates a two-dimensional image, with a mark indicating that a recorded program exists, arranged on the two-dimensional position on the two-dimensional space which has been communicated by the position calculation section 515 (step S4 in FIG. 5). The generated two-dimensional image is communicated to the display section 519.

The scroll specification section 5112 communicates an instruction to display a scroll bar along the axis indicating the day of the week on the two-dimensional space, to the display section 519.

The three-dimensional image generation section 517 generates a three-dimensional image, with the thumbnail image sent from the program information/image acquisition section 514 arranged at the position communicated from the position calculation section 515 on the three-dimensional space (step S5 in FIG. 5). The generated three-dimensional image is communicated to the display section 519.

The display section 519 displays the two-dimensional image communicated from the two-dimensional image generation section 516, the three-dimensional image communicated from the three-dimensional image generation section 517, and the scroll bar instructed by the scroll specification section 5112 to be displayed, on the display screen 102a (step S6 in FIG. 5). The process of displaying the three-dimensional image at step S6 in FIG. 5 corresponds to an example of the three-dimensional display step in the display method of the present invention. The process of displaying the two-dimensional image corresponds to an example of the two-dimensional display step in the display method of the present invention.

Figure 8:
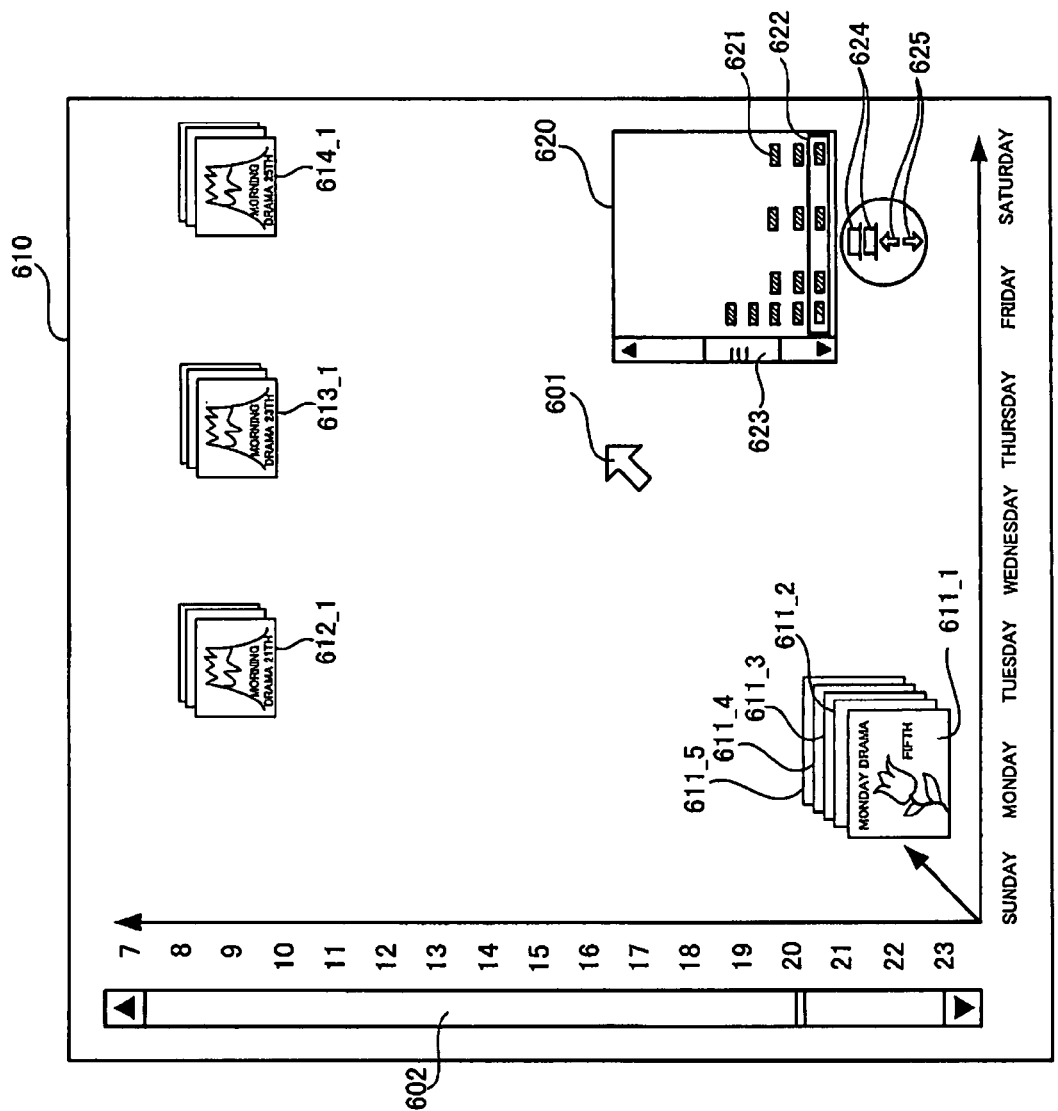
FIG. 8 is a diagram showing an example of the display screen on which a three-dimensional image, a two-dimensional image and a scroll bar are displayed.

FIG. 8 is a diagram showing an example of the display screen 102*a* on which a three-dimensional image 610, a two-dimensional image 620 and a scroll bar 623 are displayed.

In this embodiment, one year is divided into four reference periods of January to March, April to June, July to September, and October to December. In the three-dimensional image 610 and the two-dimensional image 620, only an area indicating one reference period among the periods is displayed. In the description below, the same number is given to programs delivered at the same time on the same day of the week, and the week in which each program is delivered is distinguished by a number attached at the end of the number.

In the three-dimensional image 610 shown in FIG. 8, a list of programs delivered and recorded during the period between 7 o'clock to 23 o'clock, when program recording is frequently performed in general, is displayed in the initial state. By the user moving a three-dimensional scroll bar 602 using a pointer 601, a list of programs delivered and recorded between 0 o'clock and 6 o'clock can be displayed. The thumbnail images 612_1, 613_1 and 614_1 of programs delivered at the same time on the predetermined days of the week are arranged on a straight line along the X-axis (the day of the week). The thumbnail images 611_1, 611_2, 611_3, 611_4 and 611_5 of programs delivered at the same time on the same day of every week are arranged on a straight line along the Z-axis.

As described above, according to the recording/reproduction device 500 of this embodiment, the thumbnail images of programs delivered at the same time are arranged on the same line in the three-dimensional image 610. Therefore, it is possible to visually confirm that they are related programs, such as the installments of a serial drama delivered on the same day of every week and news delivered at the same time.

In the two-dimensional image 620 shown in FIG. 8, marks 621 are displayed at positions corresponding to the positions at which the respective thumbnail images are arranged on the three-dimensional image 610, on the two-dimensional space having an X-axis indicating the day of the week and a Y-axis indicating the week. The mark 621 indicates that a program recorded on the day exists. When there are programs recorded on the same day of the week, marks 621 are displayed being arranged along the Y-axis (week direction).

In the three-dimensional image 610, the thumbnail images 611_1, 611_2, 611_3, 611_4 and 611_5 of the programs delivered at the same time on the same day of every week are arranged along the depth direction (Z-axis). Therefore, there is a problem that, in the case of failing to record a program delivered on the same day of the week, it is difficult to notice that a part of the series program does not exist. According to the recording/reproduction device 500 of this embodiment, the user can easily recognize that he or she failed to record a program delivered on the same day of the week by checking the two-dimensional image 620.

Furthermore, the scroll bar 623 which extends along the Y-axis (week) and with which the week is specified on the two-dimensional image 620, a frame 622 surrounding the range of the week selected by the scroll bar 623, and a period changing button 624 for changing the period described above, and a week changing button 625 for changing the week are also displayed on the two-dimensional image 620.

In FIG. 8, the latest week within one reference period is selected by the scroll bar 623, and the thumbnail images 611_1, 612_1, 613_1 and 614_1 of the programs delivered within the selected week are arranged at the front in the three-dimensional image 610. When the user moves the scroll bar 623 using the pointer 601, the week is changed by the scroll specification section 5112 shown in FIG. 4 according to the amount of the scrolling, and a newly selected week is communicated to the control section 522. The control section 522 communicates an instruction to change the week, to each of the two-dimensional image generation section 516 and the three-dimensional image generation section 517 to move the frame 622 on the two-dimensional image 620 to the position of the newly selected week and re-arrange the thumbnail images on the three-dimensional image 610 so that the thumbnail images of the newly selected week are at the front.

Figure 9:
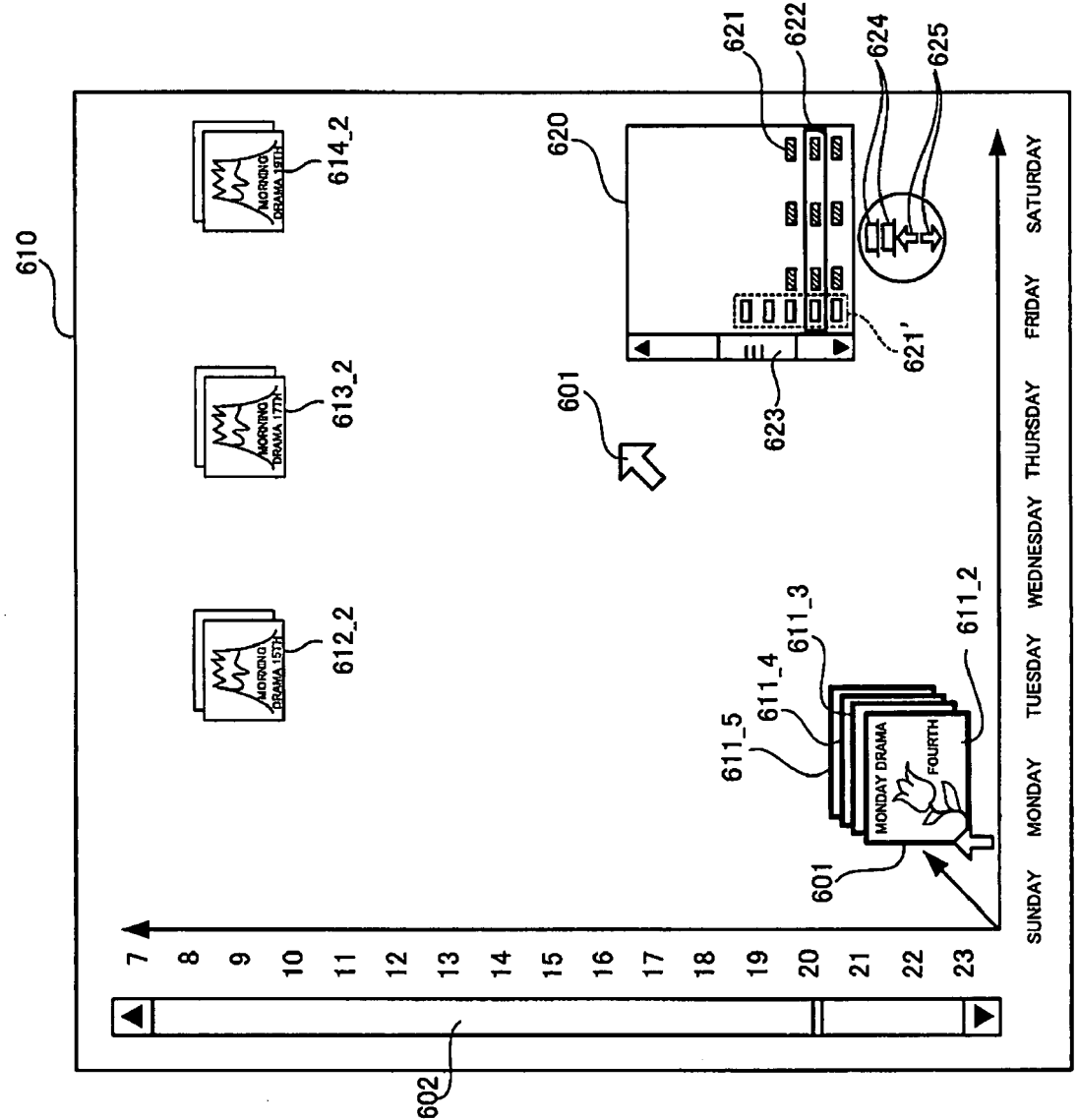
FIG. 9 is a diagram showing an example of the display screen after the week is changed.

FIG. 9 is a diagram showing an example of the display screen 102*a* after the week is changed.

In FIG. 9, the frame 622 on the two-dimensional image 620 has been moved to the position of the second latest week within the reference period, and, in the three-dimensional image 610, arrangement is performed so that the thumbnail images 611_2, 612_2, 613_2 and 614_2 of the programs delivered within the second latest week are at the front. By using the scroll bar 623, the user can easily change the display of the three-dimensional image 610.

When the user specifies one of the thumbnail images on the three-dimensional image 610 using the pointer 601 (step S5 in FIG. 5: Yes), the specification is communicated to the collective selection section 5111 of the instruction section 511. The collective selection section 5111 collectively selects the specified thumbnail image and the thumbnail images arranged in the Z-axis direction (week direction), and the selected thumbnail images are communicated to the highlighting section 520. The highlighting section 520 highlights the selected thumbnail images on the three-dimensional image 610, and highlights the marks corresponding to the selected thumbnail images on the two-dimensional image 620 (step S8 in FIG. 5).

In FIG. 9, by the user specifying the thumbnail image 611_2 arranged at the front, the thumbnail images 611_3, 611_4 and 611_5, which indicate the programs delivered at the same time on the same day of every week as the program indicated by the thumbnail image 611_2, are also collectively selected. The selected thumbnail images 611_2, 611_3, 611_4 and 611_5 are highlighted (displayed being framed), and the marks 621' arranged at the positions corresponding to the delivery dates and times of the programs indicated by the selected thumbnail images 611_2, 611_3, 611_4 and 611_5, on the two-dimensional image 620, are also highlighted (reversing display). Thus, according to the recording/reproduction device 500 of this embodiment, it is possible to easily select a series of programs delivered at the same time on the same day of every week, on the three-dimensional image 610, and it is also possible to check whether or not the programs are selected without fail by visually checking highlighted marks on the two-dimensional image 620.

When the user right-clicks the mouse 104 shown in FIG. 1 here, a popup window (not shown) for selecting an instruction to reproduce or an instruction to dub the programs of the selected thumbnail images 611_2, 611_3, 611_4 and 611_5 is displayed.

When the user selects the instruction displayed on the popup window using the pointer 601 (step S9 in FIG. 5), the content of the instruction is communicated to the reproduction section 518 or the dubbing section 521 in FIG. 4. When "reproduction" is selected, the reproduction section 518 acquires program data indicating the programs of the selected thumbnail images 611_2, 611_3, 611_4 and 611_5, from the storage section 501, and the acquired program data is communicated to the display section 519. Thereby, the programs indicated by the program data are displayed on the display screen 102*a*. When "DVD" is selected, the program data is acquired by the dubbing section 521, and the acquired program data is stored in a DVD (not shown) mounted in the personal computer 100 instead of the CD-ROM 300, via the CD/DVD drive 114 shown in FIG. 2 (step S10 in FIG. 7).

As described above, according to this embodiment, even when a lot of recorded programs are stored in the storage section 501 and thumbnail images in the depth direction are overlapped with one another on the three-dimensional image 610, the user can easily recognize which day a program is recorded on by checking the two-dimensional image 620 and easily check whether he or she failed to record any program of a series of programs delivered every week.

The first embodiment of the present invention has been described. Now, a second embodiment of the present invention will be described. The generated three-dimensional image of the second embodiment of the present invention is different from that of the first embodiment. However, the configuration of the second embodiment is similar to that of the first embodiment. Therefore, FIG. 4 is used again in the description of the second embodiment, and only points different from the first embodiment will be described.

In the recording/reproduction apparatus of the second embodiment of the present invention, a three-dimensional image is generated in which an area without a thumbnail image arranged therein is excluded. That is, the three-dimensional image generation section 517 shown in FIG. 4 excludes an area on the time axis in which a thumbnail image is not arranged, on the three-dimensional space having three axes indicating the day of the week, the time and the week, respectively, and thumbnail images are arranged on the three-dimensional space without an unnecessary area.

Figure 10:
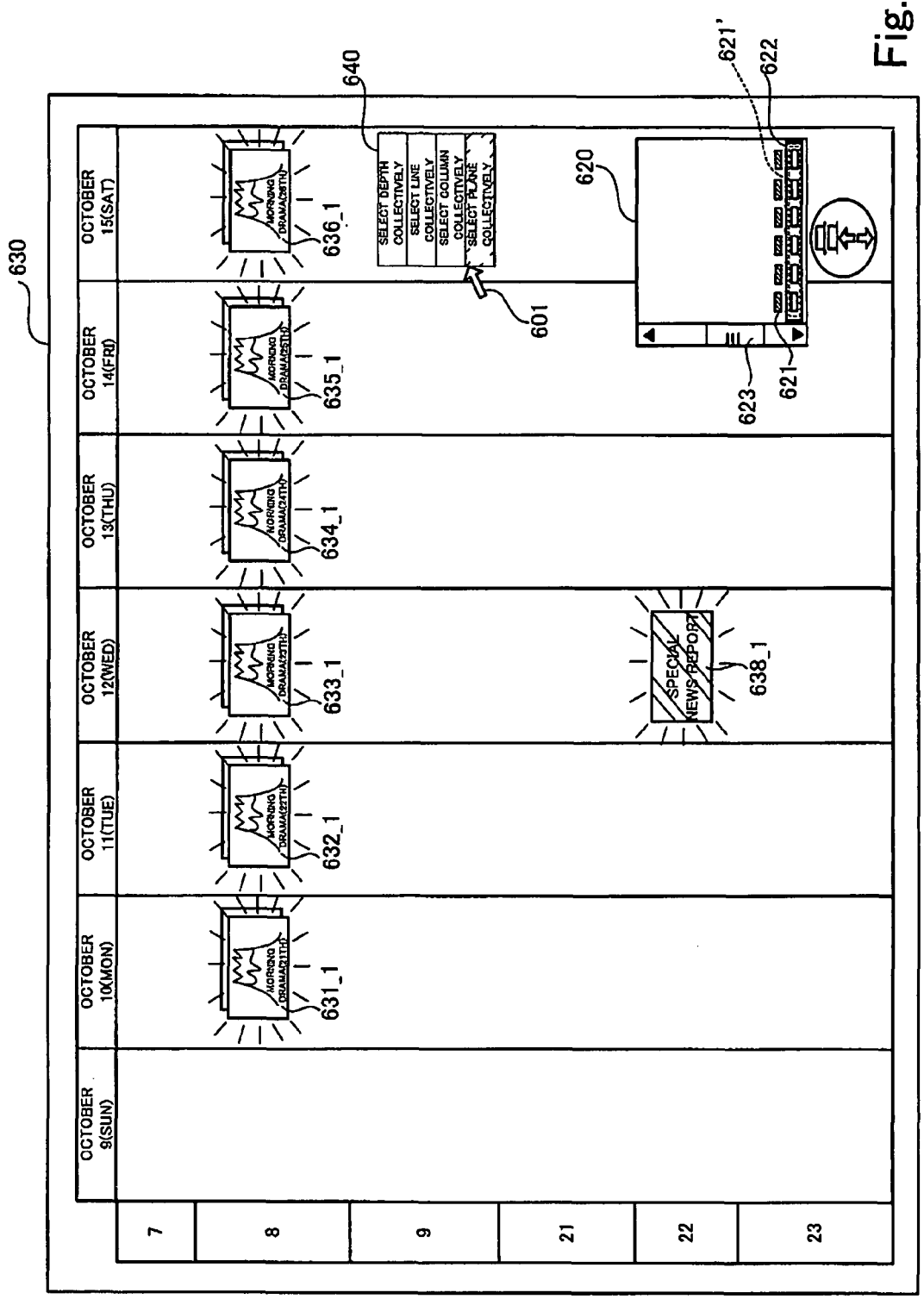
FIG. 10 is a diagram showing an example of the display screen of a recording/reproduction apparatus of a second embodiment of the present invention.

FIG. 10 is a diagram showing an example of the display screen of the recording/reproduction apparatus of this embodiment.

In a three-dimensional image 630 shown in FIG. 10, areas except the areas corresponding to the positions where thumbnail images are arranged and the areas corresponding to one hour before and after the positions are excluded on the Y-axis (time axis). In this example, only areas corresponding to 8 o'clock and 22 o'clock where the thumbnail images are arranged, and 7 o'clock, 9 o'clock, 21 o'clock and 23 o'clock before and after 8 o'clock and 22 o'clock, respectively. That is, only areas corresponding to the total of six hours are displayed, and the areas except these areas are excluded. Thus, by excluding unnecessary areas on the three-dimensional space, the areas where thumbnail images are arranged can be enlarged.

When the user right-clicks the mouse 104 shown in FIG. 1 here, a popup window 640 for selecting a thumbnail image is displayed. In this embodiment, a "depth menu" for collectively selecting thumbnail images indicating programs delivered at the same time of the same day of every week, a "line menu" for collectively selecting thumbnail images indicating programs delivered at the same time on the same week, a "column menu" for collectively selecting thumbnail images indicating programs delivered on the same day, and a "plane menu" for collectively selecting thumbnail images indicating programs delivered within the same week are prepared. In the example of FIG. 10, the "plane menu" in the popup window 640 is specified by the user, and thumbnail images 631_1, 632_1, 633_1, 634_1, 635_1, 636_1 and 638_1 indicating programs delivered within the same week are collectively selected and highlighted (lighting-up display). Furthermore, mark images 621' corresponding to the thumbnail images 631_1, 632_1, 633_1, 634_1, 635_1, 636_1 and 638_1, on a two-dimensional image 620, are also highlighted (reversing display). By highlighting selected thumbnail images and mark images corresponding to the thumbnail images as described above, it is possible to visually check when the programs indicated by the currently selected thumbnail images were delivered easily.

When the user scrolls the scroll bar 623, the frame 622 moves, and the three-dimensional image 630 is changed so that the week indicated by the position of the frame 622 is at the front. When the scroll bar 623 is scrolled to an area beyond the areas displayed on the two-dimensional image 620, the two-dimensional image 620 and the three-dimensional image 630 are changed so that the area indicating the reference period to which the newly specified week belongs is displayed.

Figure 11:
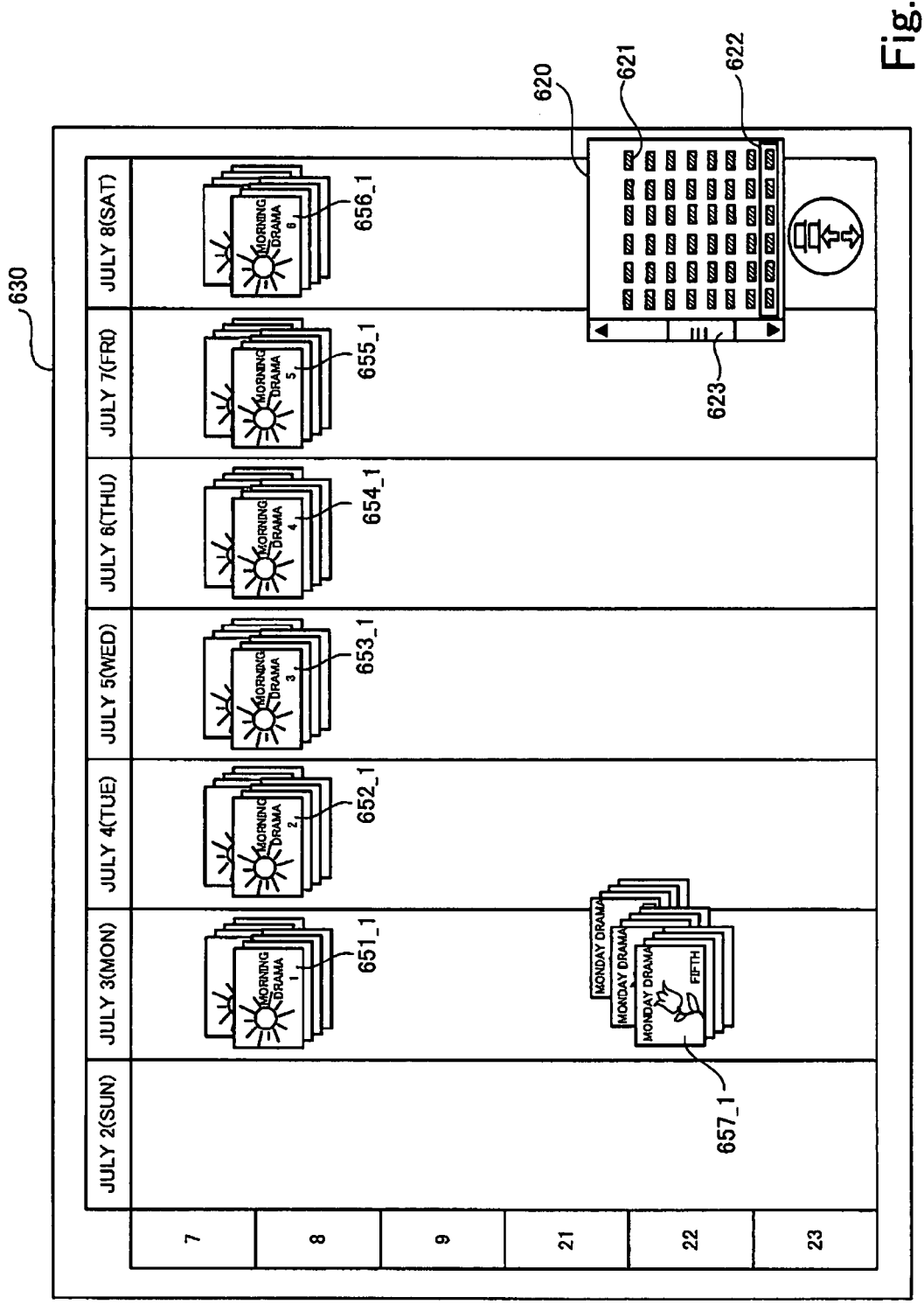
FIG. 11 is a diagram showing an example of the display screen that displays an area indicating a new reference period.

FIG. 11 is a diagram showing an example of the display screen that displays an area indicating a new reference period.

In FIG. 10, areas included in the reference period of October to December are displayed in the two-dimensional image 620 and the three-dimensional image 630. When the user moves the scroll bar 623 to beyond the oldest week on the two-dimensional image 620 in FIG. 10, areas included in the reference period of July to September, a reference period immediately previous to the reference period in FIG. 10, is displayed in the two-dimensional image 620 and the three-dimensional image 630. In the three-dimensional image 630, thumbnail images 651_1, 652_1, 653_1, 654_1, 655_1, 656_1 and 657_1 of programs delivered and recorded in July to September are arranged. In the two-dimensional image 620, mark images 621 are arranged at the positions corresponding to the positions where the thumbnail images are arranged. A series of programs delivered at the same time of every week, such as the installments of a serial drama, is often changed every several months. By changing the display of the two-dimensional image 620 and the three-dimensional image 630 for each reference period as in this embodiment, it is possible to collectively check the recording state of programs of the same series.

The second embodiment of the present invention has been described. Now, a third embodiment of the present invention will be described. The generated three-dimensional image of the third embodiment of the present invention is also different from that of the first embodiment of the present invention. However, the configuration of the third embodiment is almost similar to that of the first embodiment, FIG. 4 is used again in the description of the third embodiment, and only points different from the first embodiment will be described.

Figure 12:
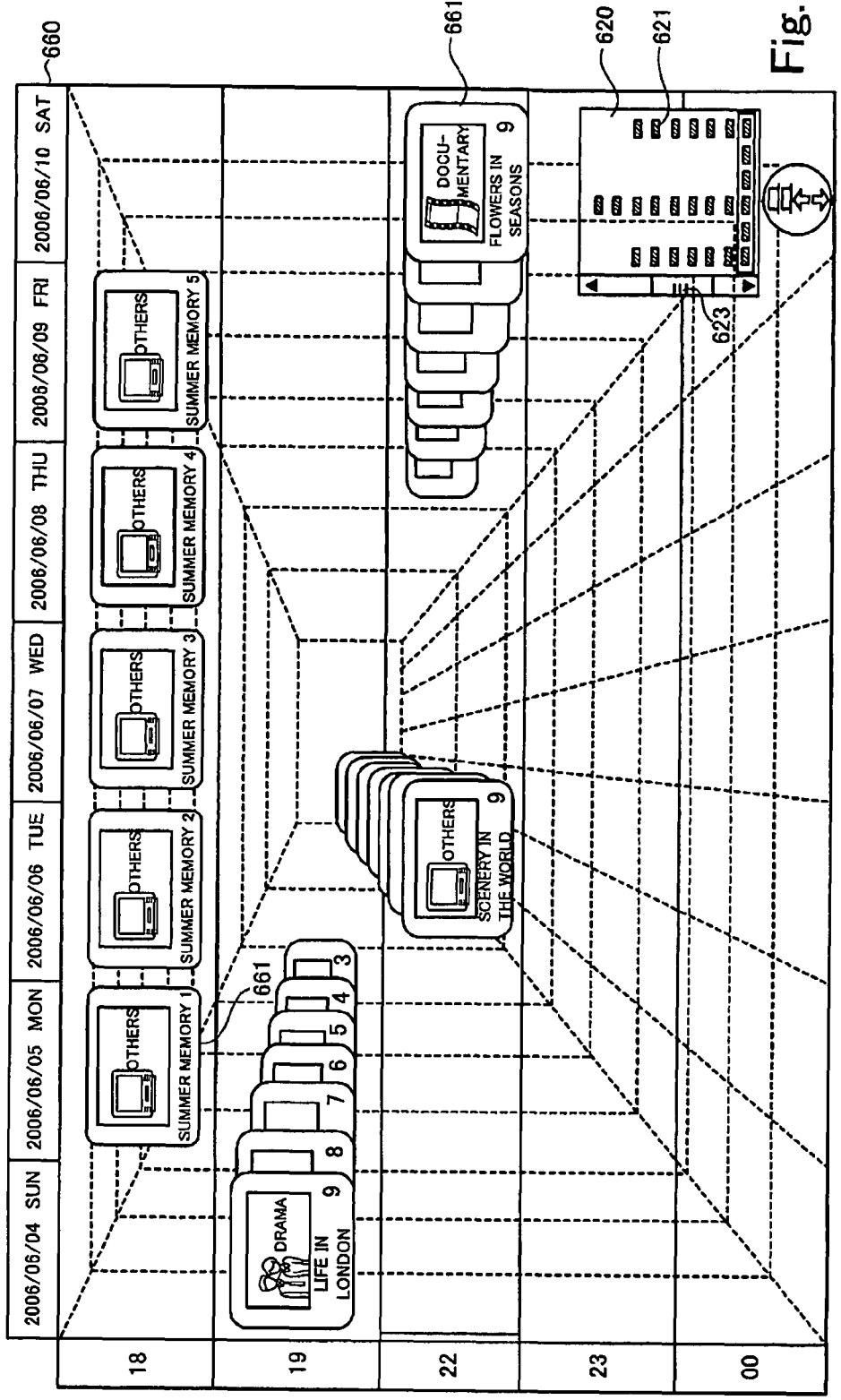
FIG. 12 is a diagram showing an example of the display screen of a recording/reproduction apparatus of a third embodiment of the present invention.

FIG. 12 is a diagram showing an example of the display screen of the recording/reproduction apparatus of this embodiment.

In the recording/reproduction apparatus of this embodiment, a three-dimensional space in which a vanishing point is set near the center of the display screen is applied instead of the three-dimensional space in which the origin is set at the lower left of the display screen (see FIG. 8). On such a three-dimensional space, a three-dimensional image 660 is displayed in which genre images 661 indicating genres of programs are arranged instead of thumbnail images. By displaying the three-dimensional image 660 in which a vanishing point is set near the center of the display screen as described above, overlap of thumbnail images or genre images in the depth direction can be easily seen, and how many recorded programs have been accumulated can be visually checked.

The third embodiment of the present invention has been described. Now, a fourth embodiment of the present invention will be described. The fourth embodiment of the present invention is different from the first embodiment in that a list of taken image data indicating taken images is displayed instead of a list of program data indicating programs. In the description below, the same elements as those of the first embodiment are given the same reference numerals, and description thereof will be omitted, and only points different from the first embodiment will be described.

Figure 13:
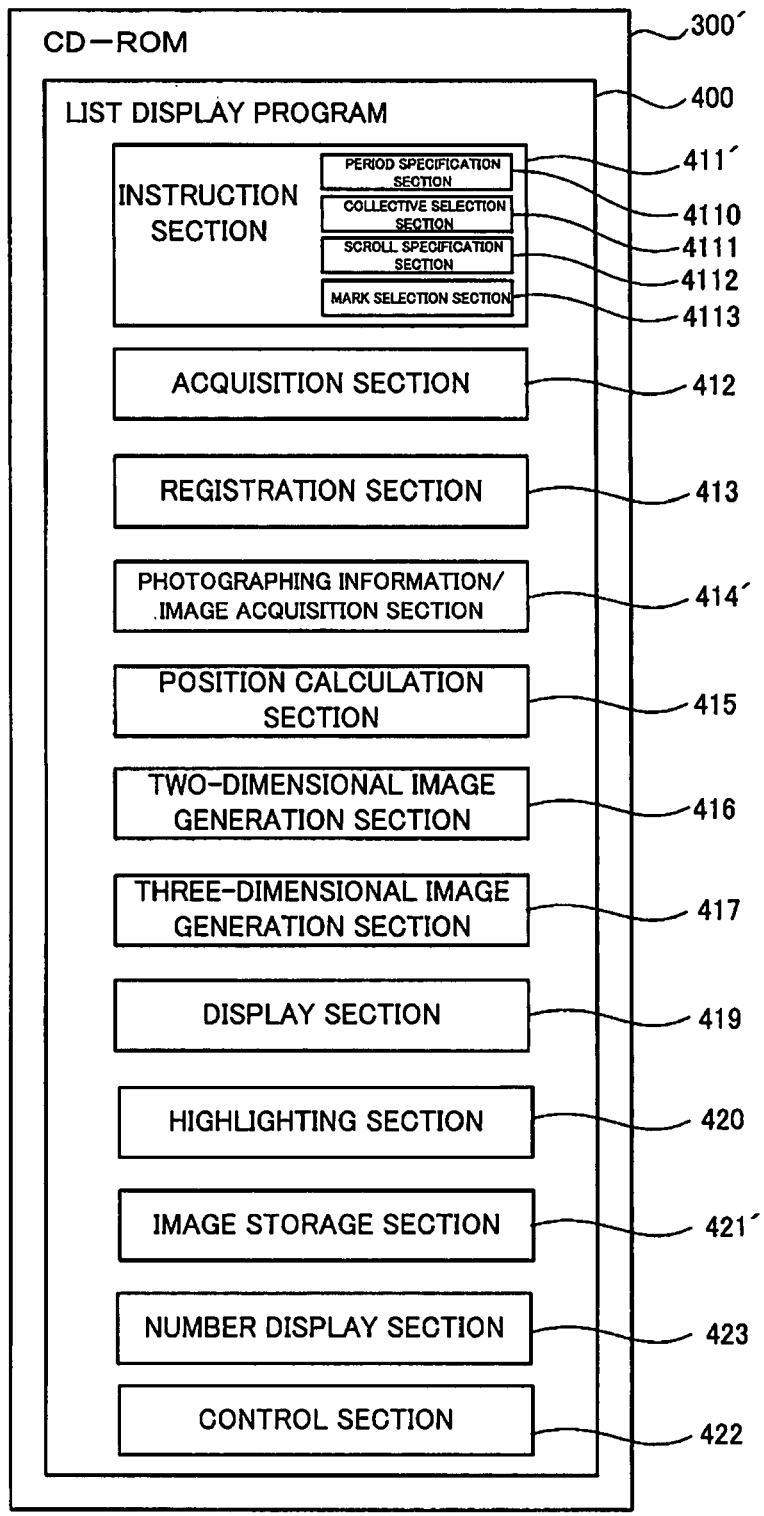
FIG. 13 is a conceptual diagram showing a CD-ROM in which a list display program is stored.

FIG. 13 is a conceptual diagram showing a CD-ROM 300' in which a list display program is stored.

A list display program 400' is provided with an acquisition section 412, a registration section 413, a position calculation section 415, a two-dimensional image generation section 416, a three-dimensional image generation section 417, a display section 419, a highlighting section 420 and a control section 422 similar to those of the recording/reproduction program 400 of the first embodiment shown in FIG. 3, and it is also provided with an instruction section 411', a photographing information/image acquisition section 414', an image storage section 421', different from those of the recording/reproduction program 400 of the first embodiment, and a number display section 423. Furthermore, the instruction section 411' of the list display program 400' has a period specification section 4110, a collective selection section 4111, a scroll specification section 4112 and a mark selection section 4113.

Figure 14:
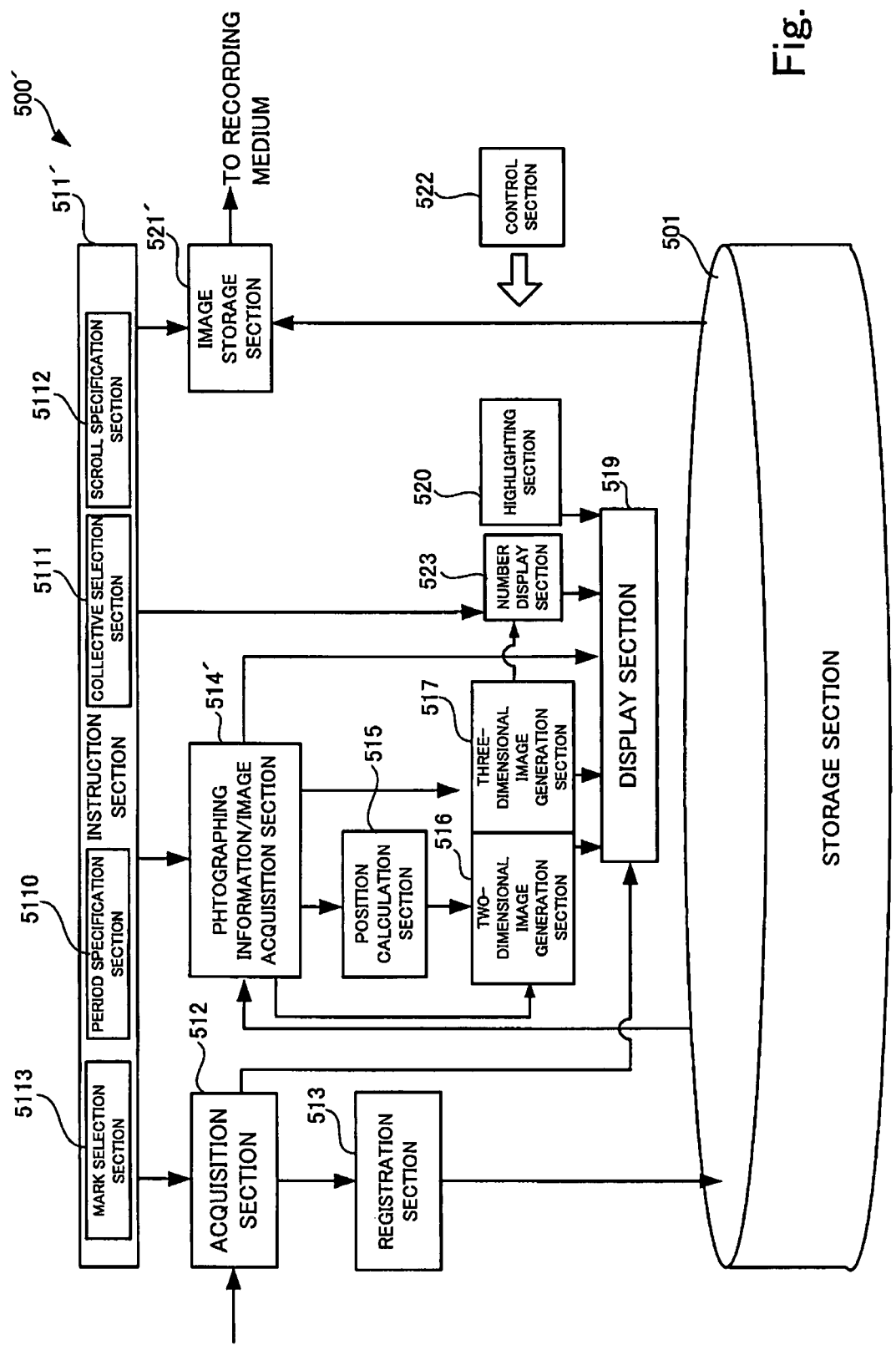
FIG. 14 is a functional block diagram of a list display device.

FIG. 14 is a functional block diagram of a list display device 500' to be constructed in the personal computer 100 when the list display program 400' is installed in the personal computer 100 shown in FIG. 1.

In addition to an acquisition section 512, a registration section 513, a position calculation section 515, a two-dimensional image generation section 516, a three-dimensional image generation section 517, a display section 519, a highlighting section 520, a control section 522 and a storage section 501 similar to those of the recording/reproduction device 500 of the first embodiment shown in FIG. 4, the list display device 500' shown in FIG. 14 is provided with an instruction section 511', a photographing information/image acquisition section 514', an image storage section 521' and a number display section 523. Furthermore, the instruction section 511' is provided with a period specification section 5110, a collective selection section 5111, a scroll specification section 5112 and a mark selection section 5113. When the list display program 400' shown in FIG. 13 is installed in the personal computer 100 shown in FIG. 1, the instruction section 411' of the list display program 400' constructs the instruction section 511' shown in FIG. 14. Similarly, the period specification section 4110 constructs the period specification section 5110, the collective selection section 4111 constructs the collective selection section 5111, the scroll specification section 4112 constructs the scroll specification section 5112, the mark selection section 4113 constructs the mark selection section 5113, the acquisition section 412 constructs the acquisition section 512, the registration section 413 constructs the registration section 513, the photographing information/image acquisition section 414' constructs the photographing information/image acquisition section 514', the position calculation section 415 constructs the position calculation section 515, the two-dimensional image generation section 416 constructs the two-dimensional image generation section 516, the three-dimensional image generation section 417 constructs the three-dimensional image generation section 517, the display section 419 constructs the display section 519, the highlighting section 420 constructs the highlighting section 520, the image storage section 421' constructs the image storage section 521', the control section 422 constructs the control section 522, and the number display section 423 constructs the number display section 523.

By describing each element of the list display device 500' shown in FIG. 14, each element of the list display program 400' shown in FIG. 13 will be also described simultaneously.

The list display device 500' of this embodiment displays a list of taken image data indicating taken images obtained by photographing a subject, and records a taken image selected by a user in a storage medium or the like.

By connecting a digital camera or a recording medium in which taken images are recorded, to the personal computer 100 shown in FIG. 1, the acquisition section 512 shown in FIG. 14 acquires the taken images to which photographing information indicating a photographing date and time, photographing conditions and the like is added. The acquired taken image data and photographing information are communicated to the registration section 513.

The registration section 513 reduces the size of the taken images indicated by the taken image data sent from the acquisition section 512 to generate thumbnail images, and stores the taken image data in the storage section 501 together with the photographing information and the thumbnail images.

An instruction screen for displaying a list of taken images is prepared in advance in the list display device 500' of this embodiment. When the user inputs an instruction to display the list with the use of the mouse 104 or the like, the instruction is communicated from the instruction section 511' in FIG. 14 to the photographing information/image acquisition section 514' in FIG. 14.

The photographing information/image acquisition section 514' acquires the photographing information and thumbnail images which are stored in the storage section 501. The acquired photographing information is communicated to the position calculation section 515, and the acquired thumbnail images are communicated to the three-dimensional image generation section 517.

The position calculation section 515 of this embodiment calculates a three-dimensional position corresponding to the photographing date and time included in the photographing information communicated from the photographing information/image acquisition section 514', on a three-dimensional space having three axes: an axis on which one day is separated every four hours, an axis on which the four hours are further separated every one hour, and an axis indicating the day; and a two-dimensional position corresponding to the three-dimensional position, on a two-dimensional space having two axes: an axis on which one day is separated every four hours and an axis indicating the day.

Figure 15:
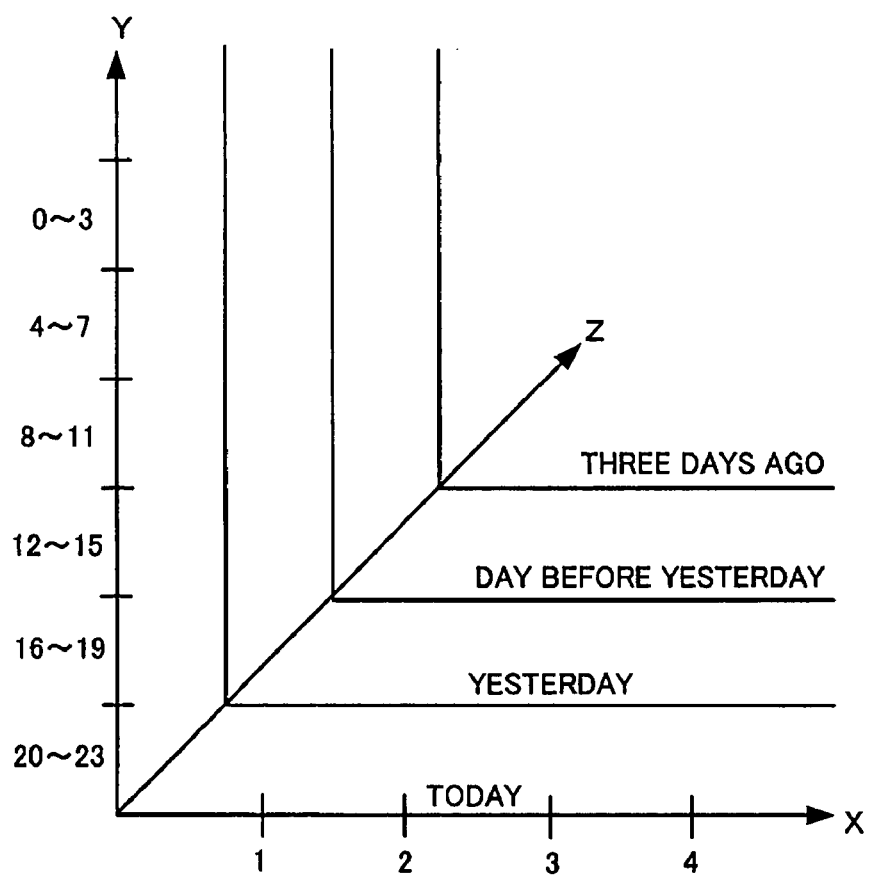
FIG. 15 is a conceptual diagram showing an example of a three-dimensional space.
Figure 16:
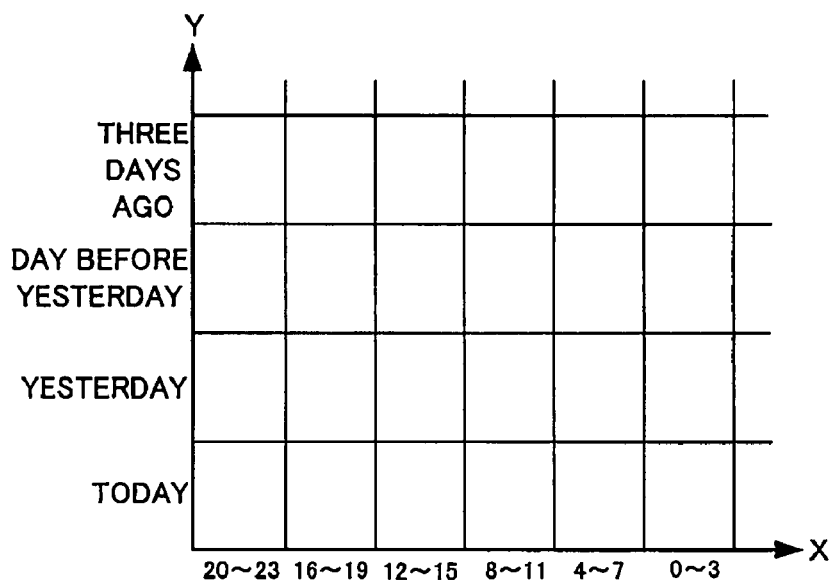
FIG. 16 is a conceptual diagram showing an example of a two-dimensional space.

FIG. 15 is a conceptual diagram showing an example of the three-dimensional space, and FIG. 16 is a conceptual diagram showing an example of the two-dimensional space.

As shown in FIG. 15, the three-dimensional space having a Y-axis (vertical direction) indicating the value obtained by separating one day every four hours, an X-axis (horizontal direction) indicating the value obtained by further separating the four hours assigned to the Y-axis, every one hour, and a Z-axis (depth direction) indicating the day is applied in this embodiment.

On the X-axis of the three-dimensional space, the values of 2, 3 and 4 are sequentially assigned, with 1 as the starting point. The value obtained by adding 1 to the value obtained by dividing the "time HH" of the photographing date and time (HH o'clock PP minutes, DD, MM, YYYY) by 4 is acquired as the value on the X-axis.

On the Y-axis of the three-dimensional space, time periods of four hours, that is, 19 o'clock to 16 o'clock, ..., 7 o'clock to 4 o'clock, and 3 o'clock to 0 o'clock are sequentially assigned, with the period of four hours from 23 o'clock to 20 o'clock as the starting point. The value obtained by dividing the "time HH" of the photographing date and time (HH o'clock PP minutes, DD, MM, YYYY) by 4 is acquired as the value on the Y-axis.

On the Z-axis of the three-dimensional space, yesterday, the day before yesterday, . . . are sequentially assigned, with today as the starting point. The value on the Z-axis is calculated on the basis of the date "DD, MM, YYYY" of the photographing date and time (HH o'clock PP minutes, DD, MM, YYYY).

As shown in FIG. 16, the two-dimensional space having an X-axis (horizontal direction) indicating the value obtained by separating one day every four hours and a Y-axis (vertical direction) indicating the day is applied in this embodiment.

On the X-axis of the two-dimensional space, time periods of four hours, that is, 19 o'clock to 16 o'clock, . . . , 7 o'clock to 4 o'clock, and 3 o'clock to 0 o'clock are sequentially assigned, with the period of four hours from 23 o'clock to 20 o'clock as the starting point. The value on the Y-axis of the three-dimensional space is immediately calculated as the value on the X-axis of the two-dimensional space.

On the Y-axis of the two-dimensional space, yesterday, the day before yesterday, . . . are sequentially assigned, with today as the starting point. The value on the Z-axis of the three-dimensional space is immediately calculated as the value on the Y-axis of the two-dimensional space.

The two-dimensional image generation section 516 generates a two-dimensional image, with marks indicating that a taken image exists arranged at the two-dimensional position calculated by the position calculation section 515, on the two-dimensional space. The three-dimensional image generation section 517 generates a three-dimensional image, with the thumbnail images communicated from the photographing information/image acquisition section 514' arranged at three-dimensional positions calculated by the position calculation section 515 on the three-dimensional space. The generated two-dimensional image and three dimensional image, and the scroll bar are displayed on the display screen 102a by the display section 519. The number display section 523 calculates the number of taken images to be displayed at the front in the three-dimensional image, and the calculated number of the taken images are displayed on the two-dimensional image. The number display section 523 corresponds to an example of the number-of-data display section according to the present invention.

Figure 17:
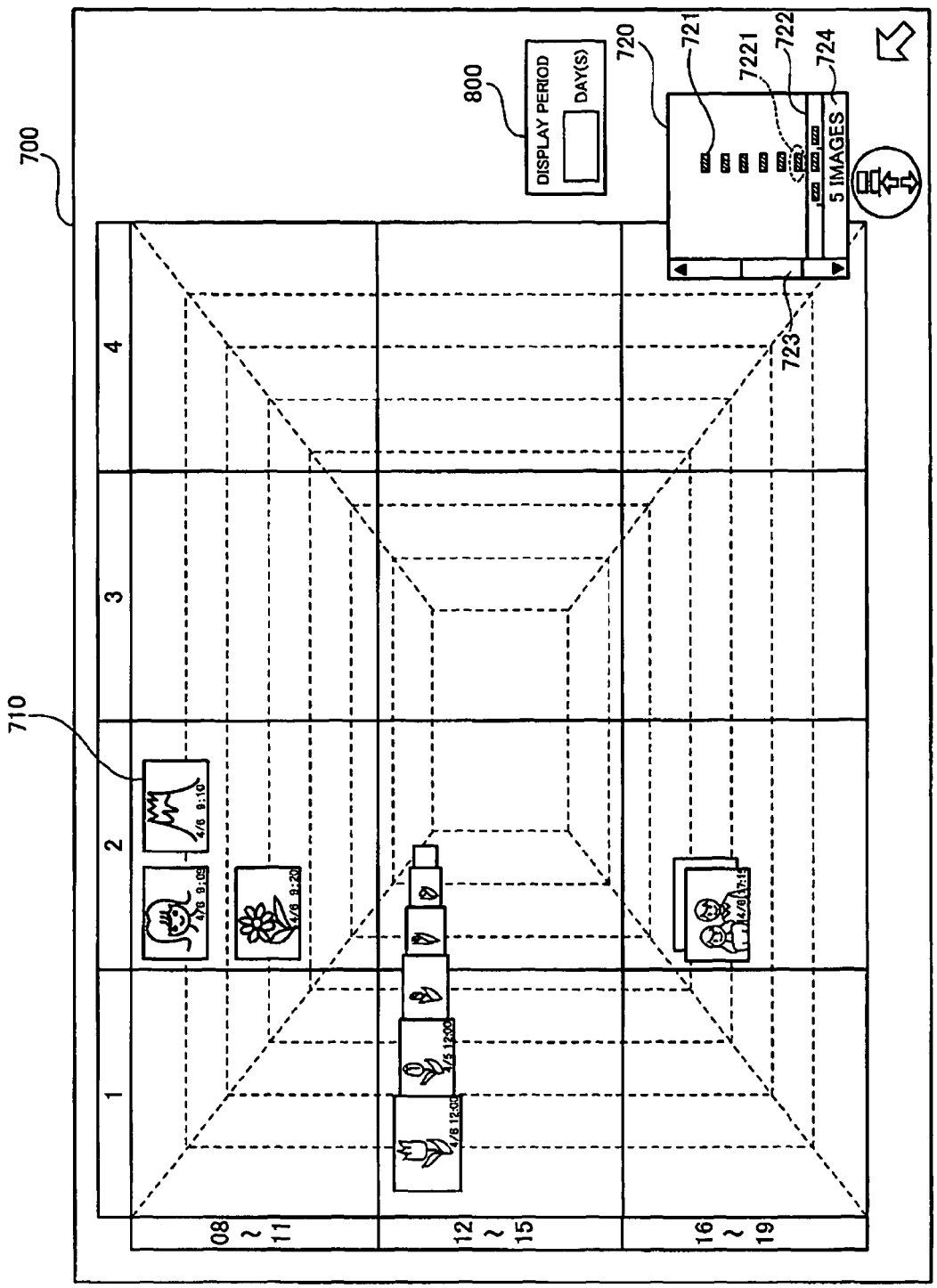
FIG. 17 is a diagram showing an example of the display screen on which a three-dimensional image, a two-dimensional image and a scroll bar are displayed.

FIG. 17 is a diagram showing an example of the display screen 102a on which a three-dimensional image 700, a two-dimensional image 720 and a scroll bar 723 are displayed.

In the initial state in which the three-dimensional image 700, the two-dimensional image 720 and the scroll bar 723 are displayed in response to an instruction to display a list, only areas indicating the period corresponding to one week is displayed with today as the starting point, in the three-dimensional image 700 and the two-dimensional image 720.

In the three-dimensional image 700 shown in FIG. 17, the thumbnail images 710 of images taken on the same day are displayed being arranged on the same plane. The position on the Y-axis of each thumbnail image 710 indicates the time zone (four-hour time zone) when the taken image indicated by the thumbnail image 710 was taken, and the position on the X-axis of each thumbnail image 710 indicates the hour in the time zone indicated by the Y-axis. For example, if the position on the Y-axis of the thumbnail image 710 is "8 o'clock to 11 o'clock", and the position on the X-axis is "2", then the arrangement position indicates that the taken image indicated by the thumbnail image 710 was taken at "nine o'clock", which is the second earliest time among the time zones "8, 9, 10 and 11 o'clock" indicated by the position on the Y-axis.

As described above, according to the list display device 500' of this embodiment, the thumbnail images of images taken on the same day are arranged on the same plane in the three-dimensional image 700, and therefore, it is possible to collectively check images taken during a travel, for example.

In the two-dimensional image 720 shown in FIG. 17, a mark 721 is displayed at a position corresponding to the position where each thumbnail image 710 is arranged in the three-dimensional image 700, on the two-dimensional space having an X-axis indicating the value of every four hours and a Y-axis indicating the day. The mark 721 indicates that there is an image taken in the "time zone" indicated by the X-axis on the "day" indicated by the Y-axis.

Thus, according to the list display device 500' of this embodiment, it is possible to easily check whether or not an image taken on a predetermined day exists by checking the two-dimensional image 720.

Furthermore, the scroll bar 723 which extends along the Y-axis (day) and with which a day is specified on the two-dimensional image 720, a frame 722 surrounding the range of the day selected by the scroll bar 723, and a number display section 724 which shows the number of images taken on the photographing day surrounded by the frame 722 are also displayed. The photographing day surrounded by the frame 722 is the photographing day of the taken images displayed at the front on the three-dimensional image 700. By checking the number display section 724, it is possible to easily recognize the number of images taken on the same day.

When the user scrolls the scroll bar 723, the frame 722 moves, and the three-dimensional image 700 is changed so that the day indicated by the position of the frame 722 is at the front, and the number of taken images displayed at the front in the three-dimensional image 700 is displayed in the number display section 724.

When the user right-clicks the mouse here, a period specification screen 800 for specifying the length of the period to be displayed on the three-dimensional image 700 and the two-dimensional image 720 is displayed. When the user inputs a period on the period specification screen 800, an instruction to change the period for display on the two-dimensional image 720 and the three-dimensional image 700 to a period with the length of the period inputted on the period specification screen 800 starting from the day specified by the frame 722 is communicated from the period specification section 5110 shown in FIG. 14 to the photographing information/image acquisition section 514' shown in FIG. 14. The period specification section 5110 corresponds to an example of the period specification section according to the present invention.

When the change of the display period is instructed, the photographing information/image acquisition section 514' acquires taken image data with which a photographing date and time within the specified display period is associated, among the taken image data stored in the storage section 501, and the acquired taken image data is communicated to the position calculation section 515, the two-dimensional image generation section 516 and the three-dimensional image generation section 517. The position calculation section 515 calculates the position of the communicated taken image data, and the two-dimensional image generation section 516 and the three-dimensional image generation section 517 generate new two-dimensional and three-dimensional images. The generated two-dimensional and three-dimensional images are displayed on the display screen 102a by the display section 519.

Figure 18:
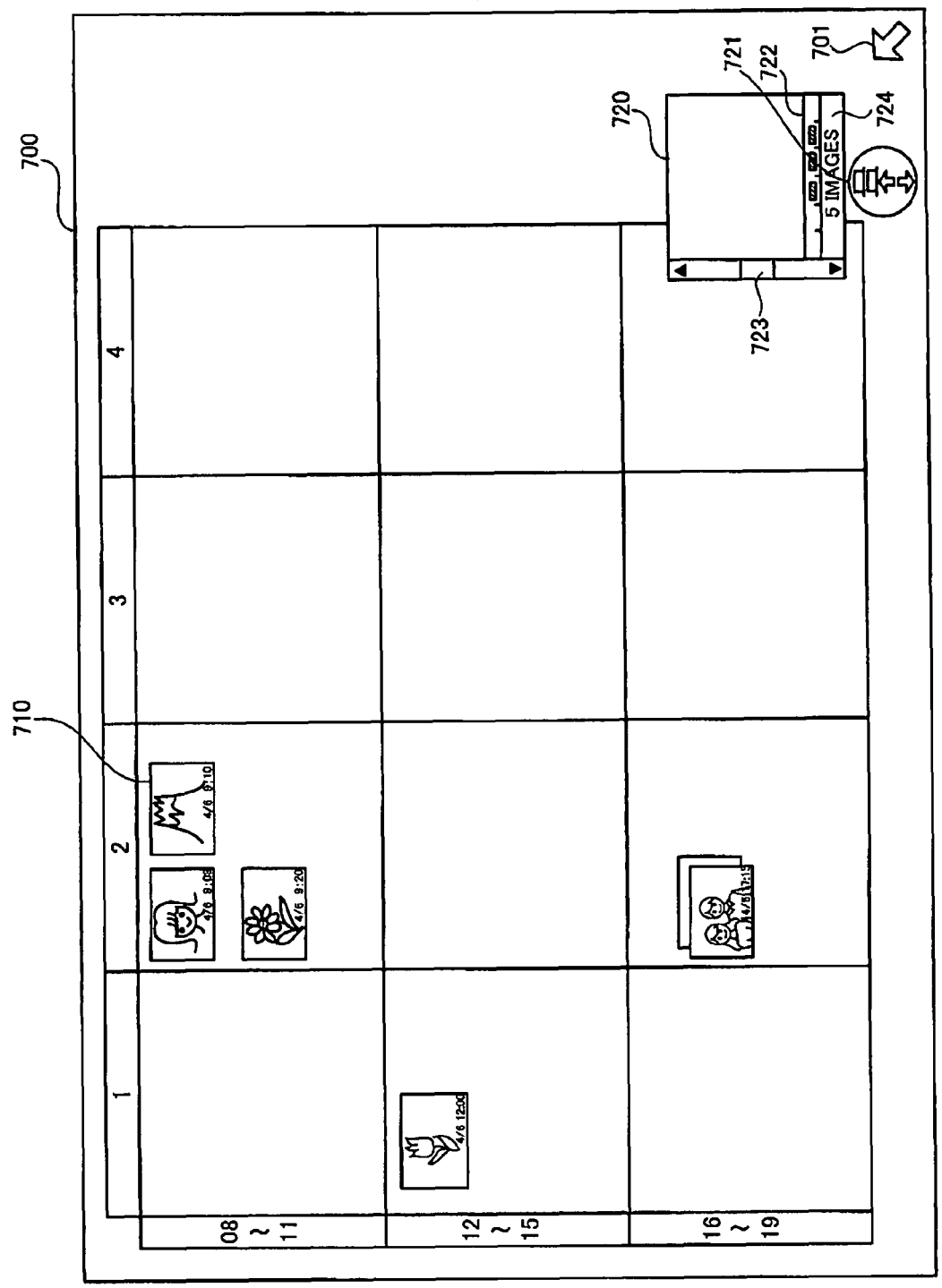
FIG. 18 is a diagram showing an example of the display screen on which the three-dimensional image and the two-dimensional image with a newly selected display period are displayed.

FIG. 18 is a diagram showing an example of the display screen 102a on which the three-dimensional image 700 and two-dimensional image 720 with the newly selected display period according to the instruction are displayed.

FIG. 18 shows the three-dimensional image 700 and the two-dimensional image 720 in the case where "one day" is inputted on the period specification screen 800 in a state that the latest photographing day is selected on the two-dimensional image 720 by the frame 722 as shown in FIG. 17. On the three-dimensional image 700, only the thumbnail images 710 of the images taken on the latest photographing day are displayed. On the two-dimensional image 720 also, only the marks 721 of the latest photographing day are displayed. Thus, by specifying the period for the display on the two-dimensional image 720 and the three-dimensional image 700, it is possible to check only images taken within a desired period.

For example, when the user selects the mark 7221 which is the second from the left and the second from the bottom, on the two-dimensional image 720 shown in FIG. 17, with the mouse 104, the photographing day and the photographing time zone indicated by the position where the selected mark 7221 is arranged are communicated from the mark selection section 5113 in FIG. 14 to the photographing information/image acquisition section 514' in FIG. 14. The mark selection section 5113 corresponds to an example of the mark selection section according to the present invention.

The photographing information/image acquisition section 514' acquires a taken image with which a photographing date and time belonging to the communicated photographing day and photographing time zone is associated, from the storage section 501, and the acquired taken image is communicated to the display section 519. The display section 519 displays the taken image communicated from the photographing information/image acquisition section 514' on the display screen 102a.

Figure 19:
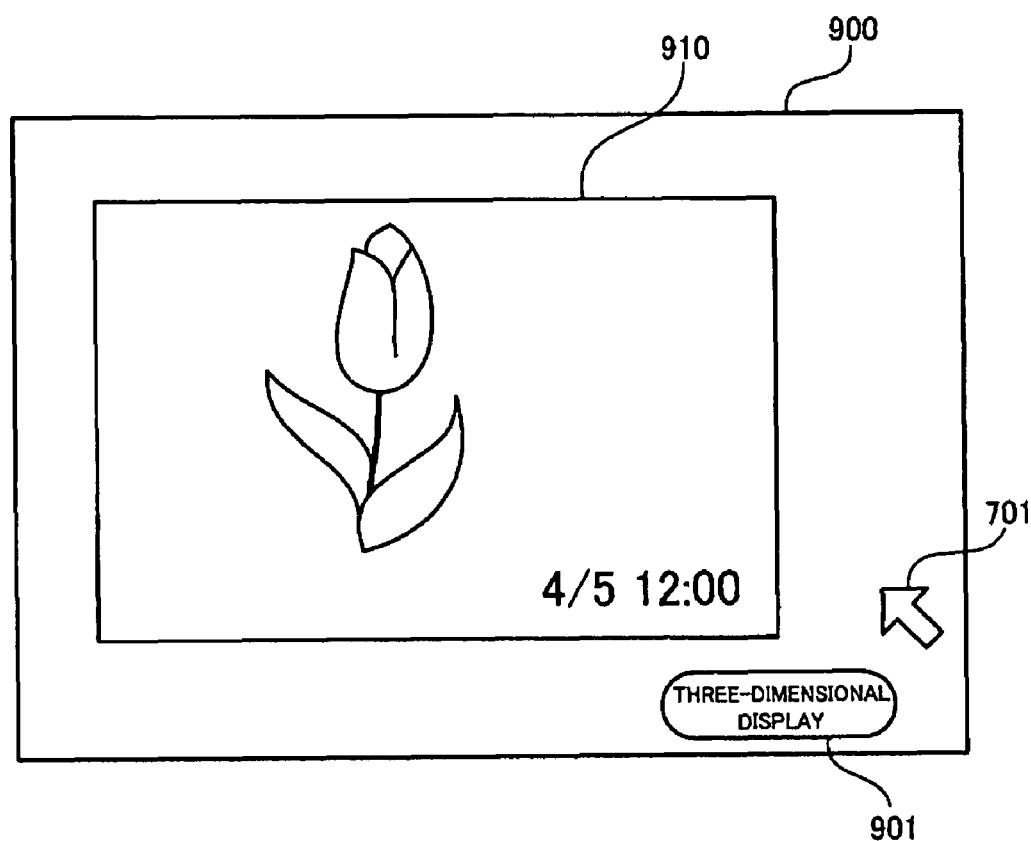
FIG. 19 is a diagram showing an example of a taken image displayed on the display screen.

FIG. 19 is a diagram showing an example of a taken image displayed on the display screen 102a.

FIG. 19 shows a taken image display screen 900 for displaying a selected taken image. The taken image display screen 900 is provided with a selected taken image 910 and a three-dimensional display button 901 for displaying the three-dimensional image 700 shown in FIG. 17. By thus selecting the mark 7221 on the two-dimensional image 720, it is possible to easily select a taken image which is usually difficult to select because taken images are arranged in line in the depth direction on the three-dimensional image 700.

Though description has been made on the case where a personal computer is applied as a display device, the display device of the present invention may be a video recorder or the like.

Furthermore, though description has been made on the case where a list of program data indicating programs or a list of taken image data indicating taken images is displayed, the data according to the present invention may be, for example, document data indicating a document if a date and time is associated therewith.

Furthermore, though description has been made on the case where a thumbnail image is generated when a program or a taken image is registered, the three-dimensional display section according to the present invention may display thumbnail images when a list of programs or taken images is displayed.

What is claimed is:

1. A display device which displays a list of data each of which a date and time is associated with, the display device comprising:
    a date and time acquisition section which acquires the date and time associated with a piece of the data;
    a three-dimensional display section which displays, when a date and time is expressed by a combination of three kinds of time units with different lengths, a three-dimensional space having axes respectively indicating the three kinds of time units, and arranges an icon indicating the piece of the data at a position corresponding to the date and time acquired by the date and time acquisition section, on the three-dimensional space; and
    a two-dimensional display section which displays a two-dimensional space having axes respectively indicating two kinds of time units including a first unit which is the longest among the three kinds of time units and has an axis direction same as a depth direction of the three-dimensional space, and arranges a mark indicating that the data with which the date and time is associated exists at the position of the date and time acquired by the date and time acquisition section, on the two-dimensional space.

2. The display device according to claim 1, wherein the data is picture data indicating a picture.

3. The display device according to claim 1, further comprising:
    a specification section which displays a specification frame along the other axis than the axis indicating the first unit, and specifies a time area having the same length as the length of the first unit by moving the specification frame along the axis indicating the first unit in response to an operation; and
    a display control section which causes the three-dimensional display section to arrange the icon, with the time area specified by the specification section positioned at the front.

4. The display device according to claim 3, wherein the display device has multiple reference periods separated at predetermined dates and times,
    when displaying the two-dimensional space, the two-dimensional display section displays only an area indicating one reference period on the two-dimensional space,
    when displaying the three-dimensional space, the three-dimensional display section displays only an area corresponding to the area displayed by the two-dimensional display section on the three-dimensional space, and
    when the specification frame is moved to a date and time beyond a reference period already displayed, on the two-dimensional space, by the specification section, the display control section causes the two-dimensional display section to change the display to an area indicating a reference period to which the date and time moved by the specification section belongs, and also causes the three-dimensional display section to change the display to an area corresponding to the area displayed by the two-dimensional display section.

5. The display device according to claim 4, further comprising a period specification section which specifies the length of the reference period,
    wherein the two-dimensional display section displays only an area indicating one reference period separated with a length specified by the period specification section, on the two-dimensional space.

6. The display device according to claim 3, further comprising a number-of-data display section which displays the number of data with each of which a date and time within the time area specified by the specification section is associated.

7. The display device according to claim 1, further comprising a mark selection section which, in response to specification of a mark arranged on the two-dimensional space, selects data associated with a date and time indicated by the position where the mark is arranged.

8. The display device according to claim 1, wherein, when displaying the three-dimensional space, the three-dimensional display section displays the three-dimensional space excluding areas in which no icon is arranged.

9. The display device according to claim 1, further comprising:
an icon selection section which, in response to specification of one of icons arranged on the three-dimensional space, collectively selects the specified icon and icons aligned with the specified icon in the direction of the axis indicating the first unit; and
an icon highlighting section which highlights the icons selected by the icon selection section.

10. The display device according to claim 1, further comprising:
an icon selection section which, in response to specification of one of icons arranged on the three-dimensional space, collectively selects the specified icon and icons aligned with the specified icon in the direction of the axis indicating a week; and
a mark highlighting section which highlights marks corresponding to the icons selected by the icon selection section among marks arranged on the two-dimensional space.

11. The display device according to claim 1, wherein the data is program data which indicates a program and with which the delivery date and time of the program is associated; and
the date and time acquisition section acquires the delivery date and time.

12. The display device according to claim 11, wherein the three-dimensional display section displays a three-dimensional space having axes indicating time, day of week, and week, respectively, and arranges an icon indicating the program at a position corresponding to the delivery date and time acquired by the date and time acquisition section on the three-dimensional space; and
the two-dimensional display section displays a two-dimensional space having axes indicating the day of week, and the week, respectively, and arranges, at a position corresponding to the day of the delivery date and time acquired by the date and time acquisition section, a mark indicating that a program delivered on the day exists.

13. The display device according to claim 1, wherein the data is taken image data which indicates a taken image obtained by photographing a subject and with which the photographing date and time of the taken image is associated; and
the date and time acquisition section acquires the photographing date and time.

14. The display device according to claim 13, wherein the three-dimensional display section displays a three-dimensional space having axes indicating three kinds of time units including the day and the time, respectively, and arranges an icon indicating the taken image at a position corresponding to the photographing date and time acquired by the date and time acquisition section on the three-dimensional space; and
the two-dimensional display section displays a two-dimensional space having axes indicating the day and the time, respectively, and arranges, at a position corresponding to the photographing date and time acquired by the date and time acquisition section, a mark indicating that an image taken at the photographing date and time exists.

15. A non-transitory display program storage medium storing a display program which is executed in a computer to construct a display device for displaying a list of data each of which a date and time is associated with, on the computer, the program constructing:
a date and time acquisition section which acquires the date and time associated with a piece of the data;
a three-dimensional display section which displays, when a date and time is expressed by a combination of three kinds of time units with different lengths, a three-dimensional space having axes respectively indicating the three kinds of time units, and arranges an icon indicating the piece of the data at a position corresponding to the date and time acquired by the date and time acquisition section, on the three-dimensional space; and
a two-dimensional display section which displays a two-dimensional space having axes respectively indicating two kinds of time units including a first unit which is the longest among the three kinds of time units and has an axis direction same as a depth direction of the three-dimensional space, and arranges a mark indicating that the data with which the date and time is associated exists at the position of the date and time acquired by the date and time acquisition section, on the two-dimensional space.

16. The display program storage medium according to claim 15, wherein the data is picture data indicating a picture.

17. A display method executed in a computer and for displaying a list of data each of which a date and time is associated with, the display method comprising:
acquiring by a processor in the computer the date and time associated with a piece of the data stored in a storage device;
displaying by the processor when a date and time is expressed by a combination of three kinds of time units with different lengths, a three-dimensional space having axes respectively indicating the three kinds of time units to a display device;
arranging by the processor an icon indicating the piece of the data at a position corresponding to the date and time acquired by the acquiring on the three-dimensional space; and
displaying by the processor a two-dimensional space having axes respectively indicating two kinds of time units including a first unit which is the longest among the three kinds of time units and has an axis direction same as a depth direction of the three-dimensional space, to the display device; and
arranging by the processor a mark indicating that the data with which the date and time is associated exists at the position of the date and time acquired by the acquiring on the two-dimensional space.

18. The display method according to claim 17, wherein the data is picture data indicating a picture.

* * * * *